United States Patent
Takahashi et al.

(10) Patent No.: US 7,599,926 B2
(45) Date of Patent: Oct. 6, 2009

(54) REPUTATION INFORMATION PROCESSING PROGRAM, METHOD, AND APPARATUS

(75) Inventors: Tetsuro Takahashi, Kawasaki (JP); Kanji Uchino, Kawasaki (JP); Seishi Okamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 335 days.

(21) Appl. No.: 11/441,147

(22) Filed: May 26, 2006

(65) Prior Publication Data

US 2007/0198530 A1 Aug. 23, 2007

(30) Foreign Application Priority Data

Feb. 17, 2006 (JP) ............................. 2006-040283

(51) Int. Cl.
*G06F 7/00* (2006.01)
(52) U.S. Cl. .................................... 707/4; 707/3; 707/6
(58) Field of Classification Search .................. 707/6–7
See application file for complete search history.

(56) References Cited

U.S. PATENT DOCUMENTS

| | | | |
|---|---|---|---|
| 6,732,090 B2 * | 5/2004 | Shanahan et al. .............. 707/3 |
| 6,820,075 B2 * | 11/2004 | Shanahan et al. .............. 707/3 |
| 2003/0069877 A1 * | 4/2003 | Grefenstette et al. ........... 707/2 |
| 2003/0225751 A1 * | 12/2003 | Kim .............................. 707/3 |
| 2004/0205059 A1 * | 10/2004 | Nishioka et al. ............... 707/3 |
| 2005/0005266 A1 * | 1/2005 | Datig .......................... 717/136 |
| 2005/0021331 A1 * | 1/2005 | Huang et al. ................. 704/231 |
| 2005/0081146 A1 * | 4/2005 | Tanaka et al. ................ 715/517 |
| 2005/0105712 A1 * | 5/2005 | Williams et al. .......... 379/265.02 |
| 2005/0119889 A1 * | 6/2005 | Yamazaki .................... 704/259 |
| 2005/0246300 A1 * | 11/2005 | Tsukamoto ................... 706/46 |
| 2006/0080314 A1 * | 4/2006 | Hubert et al. .................. 707/5 |
| 2006/0106609 A1 * | 5/2006 | Saito et al. .................. 704/260 |
| 2006/0129381 A1 * | 6/2006 | Wakita .......................... 704/9 |

FOREIGN PATENT DOCUMENTS

| | | |
|---|---|---|
| JP | 2001-155021 | 6/2001 |
| JP | 2002-091981 | 3/2002 |
| JP | 2002-175330 | 6/2002 |
| JP | 2003-271609 | 9/2003 |
| JP | 2004-157841 | 6/2004 |
| JP | 2005-063242 | 3/2005 |

\* cited by examiner

*Primary Examiner*—James Trujillo
*Assistant Examiner*—Linh Black
(74) *Attorney, Agent, or Firm*—Staas & Halsey LLP

(57) ABSTRACT

An evaluation pair extraction unit analyzes a document which is present on a network to extract an evaluation pair composed of an object and an evaluation expression, and registers it in an evaluation pair database. An evaluation pair analysis unit executes analysis such as category estimation, specific evaluation expression extraction, and comparative analysis by utilizing the evaluation pair of the database. The evaluation pair is data in which the object and the evaluation expression are combined; wherein the object is a unique object including a commercial product name, maker name, or the like which can be evaluated, and the evaluation expression of the evaluation pair is a phrase representing evaluation including like, hard to use, or the like. An evaluation pair extraction unit gives an evaluation pair extracted from a model document to a machine leaner to cause it to learn a rule which can serve as an evaluation pair, and, after the learning, correctly combines an object with an evaluation expression from an unknown document to extract an evaluation pair.

18 Claims, 37 Drawing Sheets

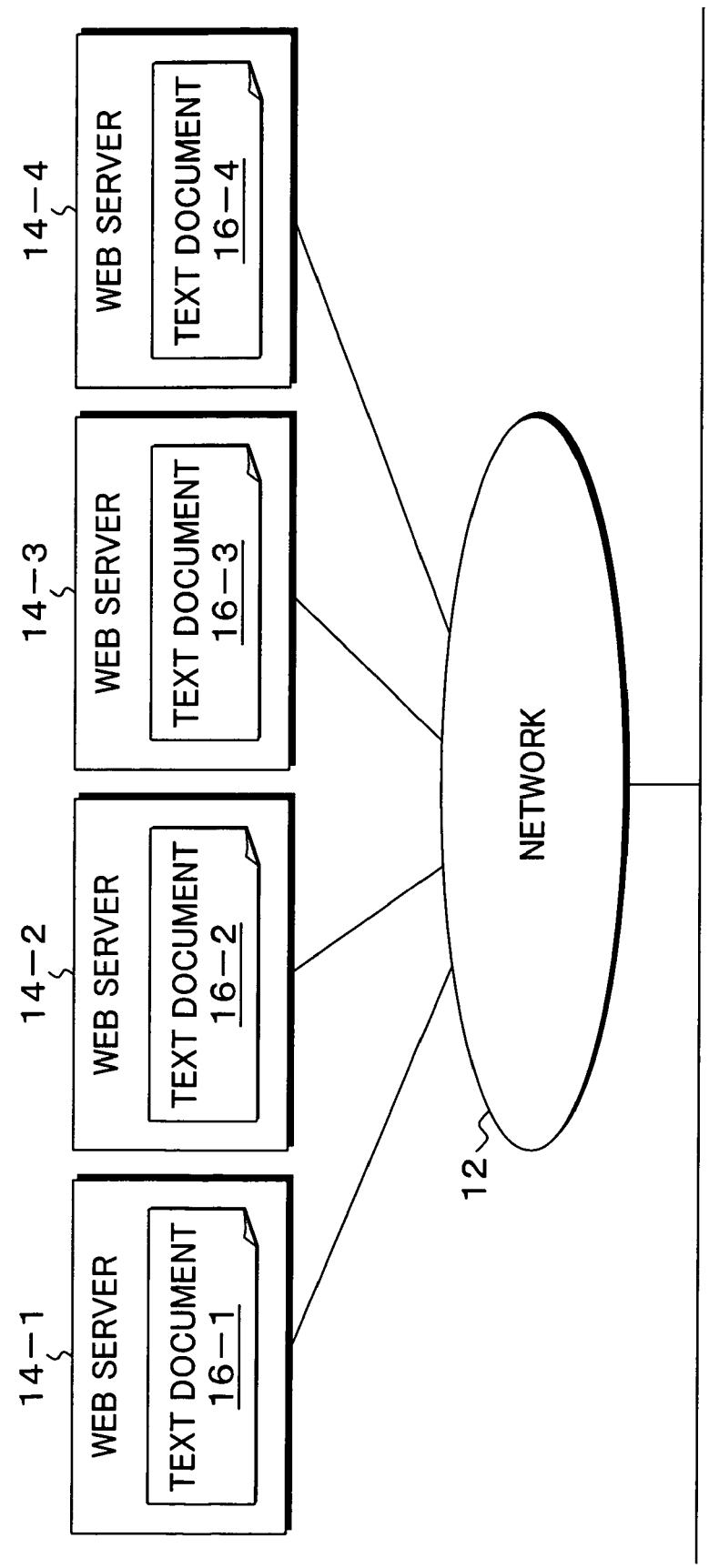

( MORPHEME ANALYSIS PROCESS ) ~86

↓

88 —
話題/の/映画/「 /オペラ座/の/怪人/ 」/を/見て/
き/まし/た/ 。 /まぁまぁ/ 、 /でし/た/ 。 /が/ 、 /
本音/を/言え/ば/思っ/た/ほど/面白く/なかっ/た/ 、
/と/いう/の/が/正直/な/ところ/ 。 /セット/や/衣装/
は/確か/に/凄い/けど/ファントム/の/描き方/が/何と
も/陳腐/で/ … /。

↓

( OBJECT EXTRACTION PROCESS ) ~90

↓

92 —
話題/の/映画/「 /<u>オペラ座/の/怪人</u>/ 」/を/見て/ ← 94
き/まし/た/ 。 /まぁまぁ/ 、 /でし/た/ 。 /が/ 、 /
本音/を/言え/ば/思っ/た/ほど/面白く/なかっ/た/ 、
/と/いう/の/が/正直/な/ところ/ 。 /セット/や/衣装/
は/確か/に/凄い/けど/<u>ファントム</u>/の/描き方/が/何と
も/陳腐/で/ … /。
                                    ↑
                                    96

↓

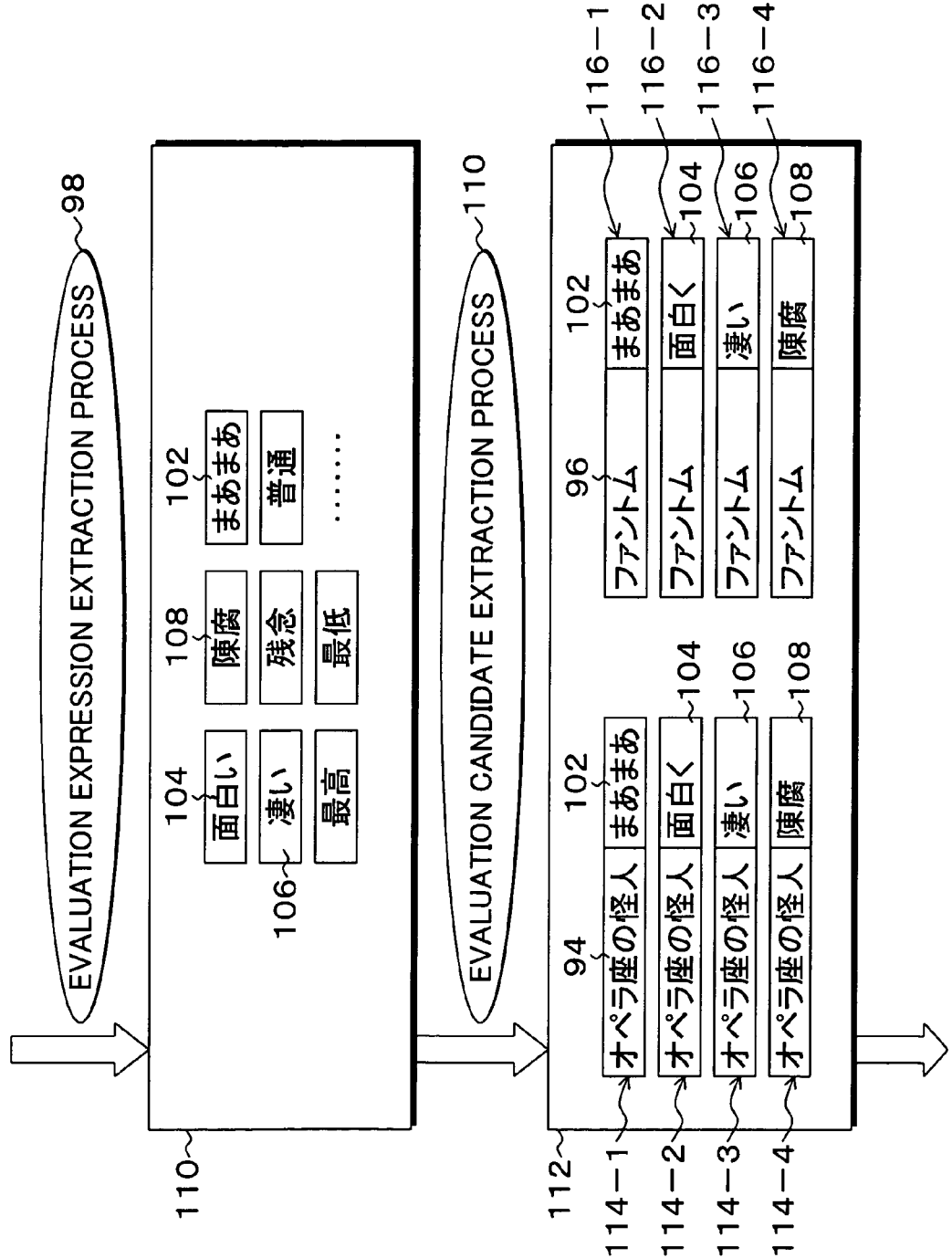

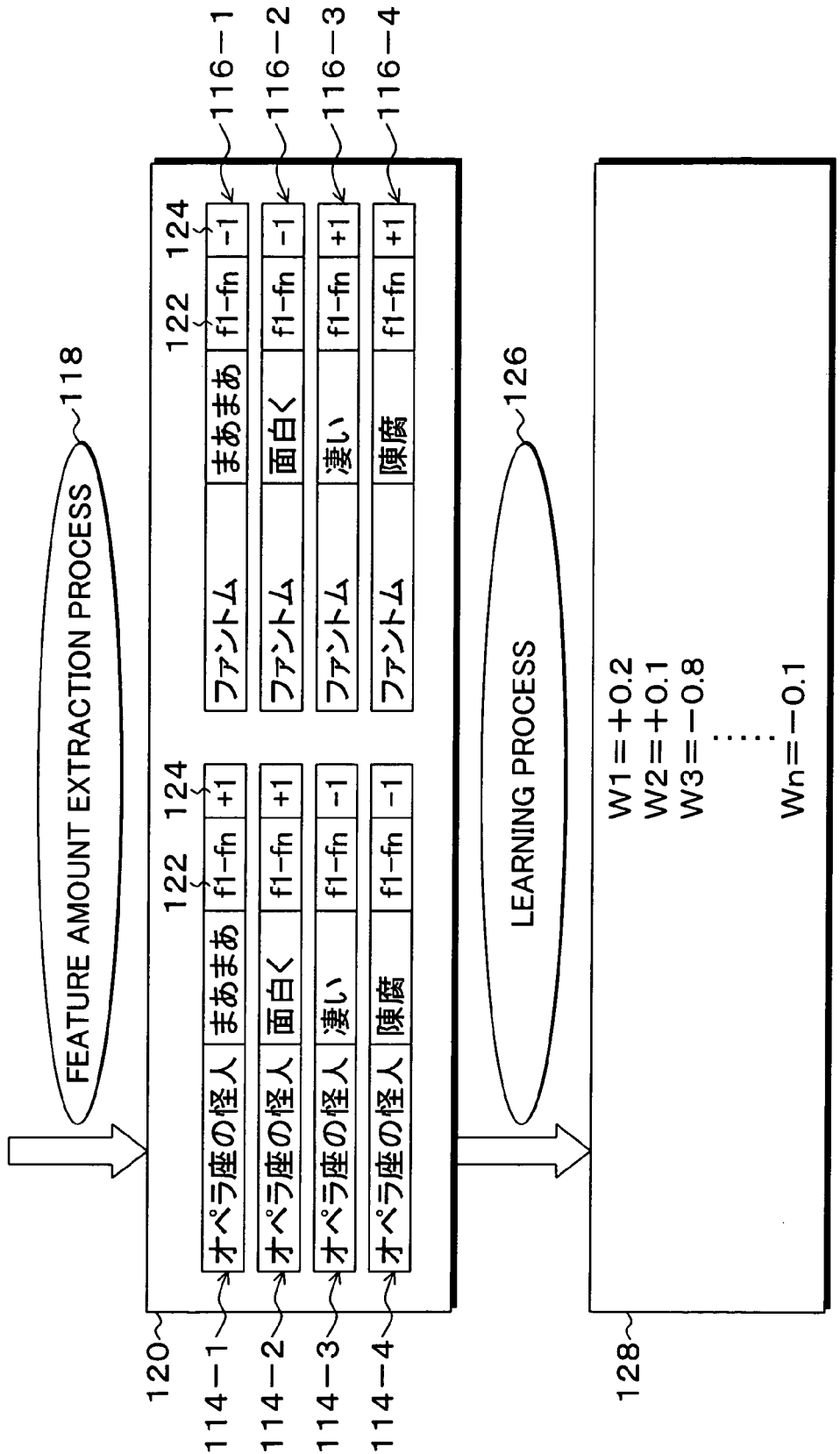

FIG. 7A 84-1

I have seen movie "Phantom of the Opera" of a topic of conversation. I guess that movie was sort of interesting, but the bottom line is that it was not so interesting as I had expected, to tell the truth. I am sure that the set and costumes of the movie was really terrible. However, the portraying manner of Phantom was hopelessly hackneyed.

OBJECT EXTRACTION PROCESS 90-1

94-1

92-1

I have seen movie "<u>Phantom of the Opera</u>" of a topic of conversation. I guess that movie was sort of interesting, but the bottom line is that it was not so interesting as I had expected, to tell the truth. I am sure that the set and costumes of the movie was really terrible. However, the portraying manner of <u>Phantom</u> was hopelessly hackneyed.

96-1

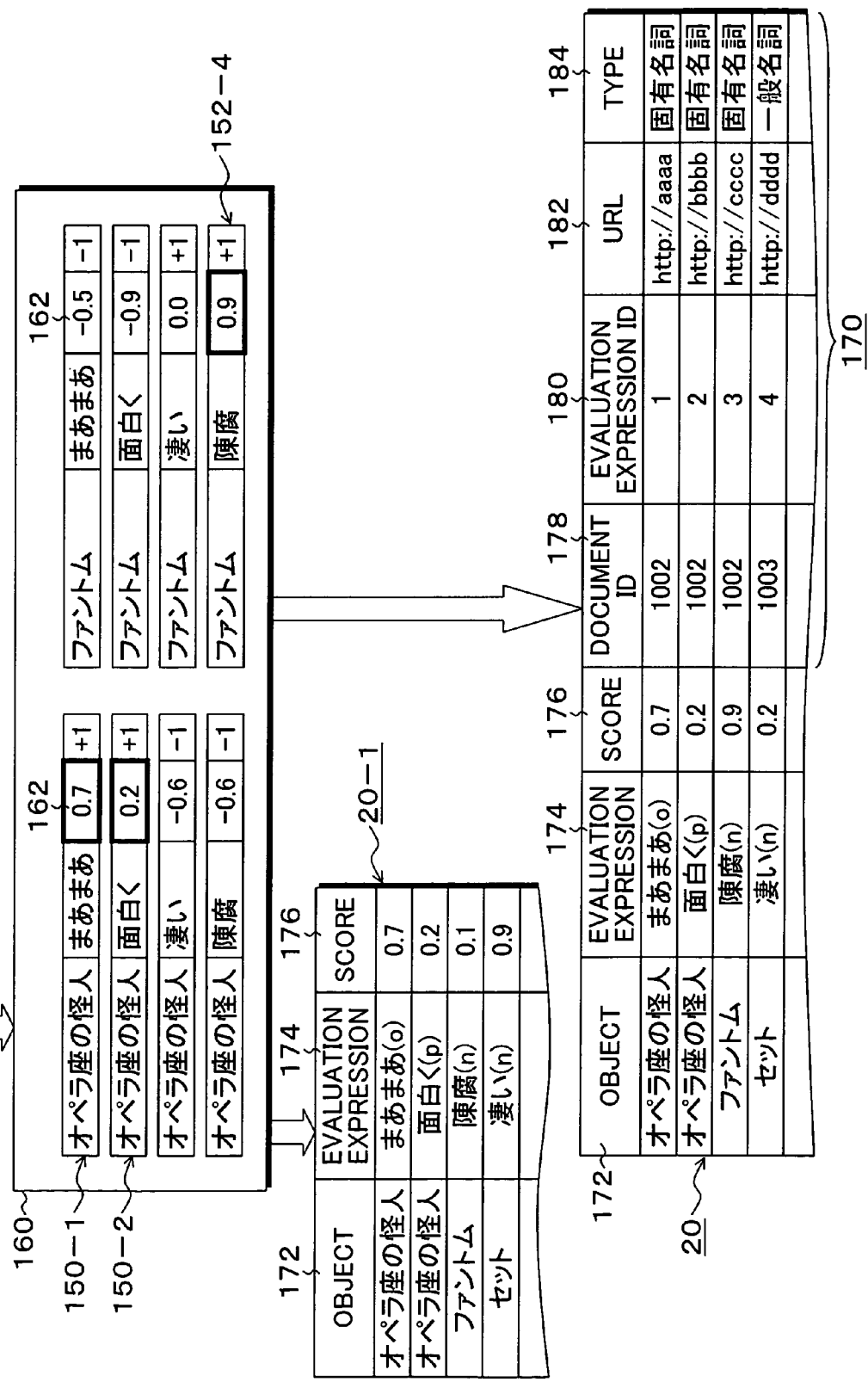

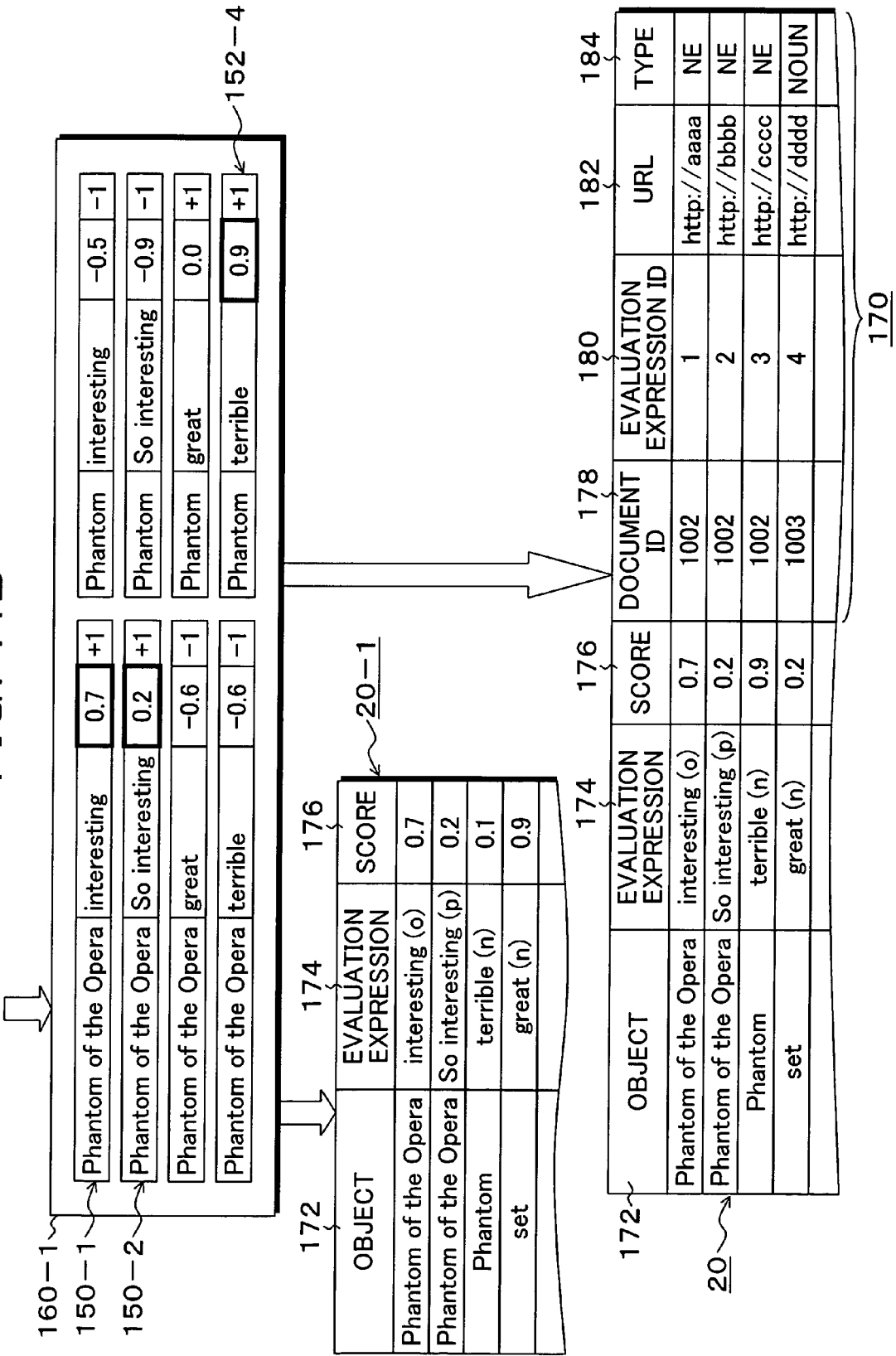

FIG. 18

| OBJECT | EVALUATION EXPRESSION | SPECIFICITY UE |
|---|---|---|
| A | LOVELY | 13.2 |
| B | BEAUTIFUL | 0.2 |
| ⋮ | ⋮ | ⋮ |

FIG. 20

| COMPARATIVE EXPRESSION | A | B | C |
|---|---|---|---|
| FAST | 5 | 2 | 8 |
| LIKE | 7 | 3 | 1 |
| EXCITING | 4 | 5 | 3 |
| SAFE | 9 | 9 | 2 |
| COMFORTABLE | 8 | 7 | 5 |
| ⋮ | ⋮ | ⋮ | |

FIG. 23

| WORD | APPEARING NUMBER |
|---|---|
| SHIFT LEVER | 30 |
| HANDLING | 24 |
| ENGINE | 10 |
| ⋮ | ⋮ |

FIG. 25

| URL | APPEARING NUMBER |
|---|---|
| http://aaaa | 102 |
| http://bbbb | 73 |
| http://cccc | 52 |
| ⋮ | ⋮ |

| URL | LARGE | LOVELY | BEAUTIFUL | |
|---|---|---|---|---|
| http://aaaa | 102 | 105 | 65 | |
| http://bbbb | 10 | 6 | 5 | |
| http://cccc | 5 | 15 | 2 | |
| ⋮ | ⋮ | ⋮ | ⋮ | |

REPUTATION INFORMATION PROCESSING PROGRAM, METHOD, AND APPARATUS

This application is a priority based on prior application No. JP 2006-040283 filed Feb. 17, 2006/03/16 in Japan.

BACKGROUND OF THE INVENTION

1. Field of the Invention

The present invention relates to a reputation information processing program, method, and apparatus for extracting reputation information written by users from text documents and the like of web pages on the Internet and analyzing them; and, particularly relates to a reputation information processing program, method and apparatus for extracting evaluation pairs, in which objects and evaluation expressions are combined, as evaluation information from text documents written by users and analyzing them.

2. Description of the Related Arts

Conventionally, there have been several processing methods which belong to the field of data mining used in analysis or marketing by extracting reputation information of commercial products, makers, etc. contained in text documents written by users from webs on the Internet, and, for example, there are the methods listed below.
(1) Methods of searching documents including both objects and evaluation expressions (JP2001-1550212 and JP2005-063242).
(2) Methods of determining evaluation expressions as reputation information of searched words if the evaluation expressions are present within a predetermined distance from the searched words (JP2002-091981 and JP2002-175330).
(3) Methods using patterns of formats of word sequences for extraction (JP2003-271609 and JP2004-1578416).
(4) Methods of extracting reputation information with respect to search words provided by users (JP2001-155021, JP2002-091981, JP2002-175330 and JP2005-063242).

However, such conventional methods of extracting reputation information written by users on the Internet and using it in analysis or marketing have the following problems. The methods of (1) and (2) have problems that the accuracy of extracted reputation information is low since objects and evaluation expressions which accidentally appear in the same document or in the vicinity of the same document are also extracted. In the method of (3), although extraction can be performed by a pattern when an object and reputation appear continuously as shown by underlines in "Japan is a goodplacetolive", they often appear away from each other in actual documents, like "I live in Japan now, and it is a very goodplacetolive";

thus, it has a problem that picking-out accuracy is low merely by use of a pattern. The method of (4) has drawbacks that reputation information about objects which are not input by users cannot be obtained, and that comparison between a plurality of objects is difficult. Moreover, as a method for visualization for analysis, merely a method of plotting the number of remarks in simple distribution of remarks or in a temporal sequence has been proposed; however, analysis satisfactory for marketing cannot be performed merely with that. Furthermore, important information for analysis includes attributes. For example, casting, music, and story are provided for an object "movie"; and CPU speed, memory capacity, HDD capacity, etc. are provided for an object "personal computer". However, such information of attributes is provided merely by manpower, which takes high cost.

SUMMARY OF THE INVENTION

According to the present invention to provide a reputation information processing program, method, and apparatus which extract reputation information with high accuracy from a wide range, enable various analysis of the reputation information, and enable automatic extraction of attributes of objects from evaluation expressions.

(Program)

The present invention provides a reputation information processing program. The reputation information processing program of the present invention is characterized by causing a computer to execute an evaluation pair extraction step of analyzing a document which is present on a network, extracting an evaluation pair in which an object and an evaluation expression are combined, and registering the evaluation pair in a database; and an evaluation pair analysis step of executing desired analysis by utilizing the evaluation pair of the database.

Herein, the object of the evaluation pair is a unique object including a product name, maker name, or the like which can be evaluated; and the evaluation expression of the evaluation pair is a phrase including like, hard to use, or the like which represents evaluation.

The evaluation pair extraction step has an evaluation pair learning step of giving an evaluation pair extracted from a model document for training to a machine learner so as to cause the machine learner to learn a rule which can serve as the evaluation pair; and an evaluation pair extraction execution step of inputting an unknown document to the machine learner and extracting an evaluation pair based on the learnt rule.

The evaluation pair learning step has a morpheme analysis step of subjecting the model document to morpheme analysis;

an object extraction step of extracting a unique expression and a noun phrase from the model document which has undergone morpheme analysis and causing the noun expression and the noun phrase to serve as objects;

an evaluation expression extraction step of extracting an evaluation expression from the model document which has undergone morpheme analysis by use of an evaluation expression dictionary;

a learning evaluation pair extraction step of extracting an evaluation pair candidate in which the object and the evaluation expression are combined, extracting a feature amount of the evaluation pair candidate, and setting whether the combination of the evaluation pair candidate is correct or not; and a model generating step of inputting the feature amount and the correctness of the learning evaluation pair to the machine learner, and generating an evaluation pair sorting model in which the rule which can serve as the learning evaluation pair is learnt.

The Evaluation Pair Extraction Execution step has a morpheme analysis step of subjecting an unknown document to morpheme analysis;

an object extraction step of extracting a unique expression and a noun phrase from the unknown document which has undergone morpheme analysis and causing the noun expression and the noun phrase to serve as objects;

an evaluation expression extraction step of extracting an evaluation expression from the unknown document which has undergone morpheme analysis by use of an evaluation expression dictionary;

an evaluation pair candidate extraction step of extracting an evaluation pair candidate in which the object and the evaluation expression are combined; and an evaluation pair determination step of inputting the evaluation pair candidate to the machine learner, extracting a feature amount of the evaluation pair candidate by use of the evaluation pair sorting model, determining the evaluation pair candidate having the feature amount of equal to or more than a predetermined value as an evaluation pair of the unknown document, and registering the evaluation pair in the database.

The morpheme analysis step is executed merely for a document of a language such as Japanese, Chinese, or Korean in which words are not divided by spaces, and the process is skipped for a document of a language in which words are divided by spaces like English, German, and French.

In the evaluation pair extraction step, as extension information, a document ID, an evaluation expression ID, a network address including URL, a type of the object whether the object is a unique noun or a general noun are further added to the evaluation pair in which the object and the evaluation pair are combined.

The evaluation pair analysis step has an input step of inputting one or a plurality of evaluation expression specifying a specified category;

an evaluation pair searching unit of searching an evaluation pair for each of the input evaluation expression from the database; and a category estimation unit of estimating the searched evaluation pair as an evaluation pair which belongs to the specified category and registering the evaluation pair to the database. Herein, in the category estimation unit, when the number of the searched evaluation pair is equal to or more than a predetermined minimum element number, the evaluation pair is estimated as an evaluation pair which belongs to the specified category.

The evaluation pair analysis step has a determination step of determining an evaluation expression specific to the object based on difference of distribution of evaluation expressions between a plurality of objects which belong to the category. In the determination step, $$UE(C, a, e) = \frac{fr(a, e)}{\sum_{i \in C, i \neq a} fr(i, e) + \varepsilon}$$

is calculated as specificity UE (C, a, e) for determining specificity of an evaluation expression, wherein, C is a category a is an object, e is an evaluation expression, fr (a, e) is the number of evaluation pair of the object a, fr (i, e) is the number of evaluation pair other than the object a, and ε is a constant for preventing the denominator from becoming 0, and the evaluation expression is determined to be a specific evaluation expression when the specificity is equal to or more than a predetermined threshold value.

The evaluation pair analysis step has an evaluation degree determination step of detecting, for each object, the appearing number of each evaluation expression that a plurality of objects which belong to the category has in common, and subjecting degrees of the evaluation expressions of a plurality of objects to comparative display. In the evaluation degree determination step, a radar chart is drawn and displayed according to the appearing number of a plurality of the evaluation expressions detected for the object.

The evaluation pair analysis step has a document obtaining step of searching the document ID added to the evaluation pair composed of the specified object and the evaluation expression from the database and obtaining a document corresponding to the document ID; and a co-occurring term analysis step of extracting a phrase other than the object contained in the obtained document, counting the appearing number of the phrase, and extracting the phrase having a large appearing number as a co-occurring term which serves as a cause or a reason of the evaluation expression of the object.

The evaluation pair analysis step has a network document obtaining step of searching a network address such as a blog added to the evaluation pair of the specified object and evaluation expression from the database and accessing the network address so as to obtain a document; and a profile generating step of counting the appearing number of the evaluation expression contained in the obtained document and generating a user profile in which the appearing number of the evaluation expression is registered wherein the network address serves as a writer.

In the evaluation pair analysis step, the appearing number of the evaluation expression is counted for each network address from the evaluation pair database, a network address having the appearing number which is equal to or more than a predetermined threshold value is set as an inappropriate site such as a commerce site, a spam blog, or the like, and the evaluation pair thereof is eliminated from the evaluation pair database.

The evaluation pair analysis step has an attribute extraction step of extracting an attribute that the object which belongs to the category has.

The Attribute Extraction Step has a document obtaining step of searching the document ID added to the evaluation pair composed of the specified object and evaluation expression from the database and obtaining a corresponding document; and a co-occurring term analysis step of extracting a phrase other than the object contained in the obtained document so as to count the appearing number of the phrase, and extracting the phrase having a large appearing number as a co-occurring term which serves as a cause or a reason of the evaluation expression of the object; wherein, the co-occurring term extracted in the co-occurring term analysis step is set as an attribute of the object.

The attribute extraction step has an evaluation pair combination analysis step of searching a combination of the evaluation pair including the specified evaluation expression from the database and setting an attribute relation between the object contained in the combination of the evaluation pair.

The attribute extraction step has an expansive evaluation pair extraction step of analyzing a document present on a network, extracting an evaluation pair in which an object and an expansive evaluation expression, in which a variable X and an evaluation expression are combined, are combined, and registering the evaluation pair in the database; and a variable extraction step of searching an evaluation pair of the specified object from the database and extracting a variable X of the expansive evaluation expression of the searched evaluation pair as an attribute of the object.

(Method)

The present invention provides a reputation information processing method. The reputation information processing method of the present information is characterized by having an evaluation pair extraction step of analyzing a document which is present on a network, extracting an evaluation pair in which an object and an evaluation expression are combined, and registering the evaluation pair in a database; and an evaluation pair analysis step of executing desired analysis by utilizing the evaluation pair of the database.

(Apparatus)

The present invention provides a reputation information processing apparatus. The reputation information processing apparatus of the present invention is characterized by having an evaluation pair extraction unit for analyzing a document which is present on a network, extracting an evaluation pair in which an object and an evaluation expression are combined, and registering the evaluation pair in a database; and an evaluation pair analysis unit for executing desired analysis by utilizing the evaluation pair of the database.

According to the present invention, when, with respect to text documents of users obtained from web pages which are present on a network such as the Internet, evaluation pairs in which objects such as "maker" and "commercial product" are combined with evaluation expressions such as "good" and "bad" representing opinions of the user are extracted by use of machine learning and registered in a database, reputation information on the network can be automatically collected efficiently from a wide range at high accuracy. In this case, when extraction of evaluation pairs is performed based on the machine learning, the extraction accuracy can be improved. Moreover, when unique expression extraction and noun phrase identification are performed based on morpheme analysis of a document, evaluation pairs composed of arbitrary objects and evaluation expressions can be automatically extracted. Moreover, various analysis can be performed by utilizing the evaluation pairs composed of objects and evaluation expressions which are registered in the database. The analysis includes:

(1) category estimation of objects according to the type of evaluation expressions,
(2) extraction of evaluation expressions which are specific to particular objects,
(3) comparison of evaluation expressions with respect to objects,
(4) analysis according to co-occurring terms which are phrases serving as causes or reasons of evaluation expressions with respect to objects,
(5) generation of user profiles such as blogs,
(6) extraction of attributes that categories of particular objects have, etc. The above and other objects, features, and advantages of the present invention will become more apparent from the following detailed description with reference to the drawings.

BRIEF DESCRIPTION OF THE DRAWINGS

FIGS. 5A and 5B are an explanatory diagrams of a morpheme analysis process and an object extraction process of FIG. 4 for a Japanese document;

FIG. 5C is an explanatory diagram of an evaluation expression extraction process, an evaluation candidate extraction process, a feature amount extraction process, and a learning process of FIG. 4 subsequent to FIGS. 5A and 5B;

FIG. 7A is an explanatory diagram of an object extraction process of FIG. 4 for an English document;

FIGS. 9A and 9B are explanatory diagrams of a feature amount extraction process and a sorting process of FIG. 8 for a Japanese document;

FIGS. 11A and 11B are explanatory diagrams of a feature amount extraction process and sorting process of FIG. 8 for an English document;

FIG. 18 is an explanatory diagram of a specificity extraction list obtained in the process of FIG. 17;

FIG. 20 is an explanatory diagram of a comparative analysis list obtained in the process of FIG. 19;

FIG. 23 is an explanatory diagram of the co-occurring term list generated in the process of FIG. 22;

FIG. 25 is an explanatory diagram of the URL list generated in the process of FIG. 24;

FIG. 27 is an explanatory diagram of a filtering list generated in the process of FIG. 26;

DETAILED DESCRIPTION OF THE PREFERRED EMBODIMENTS

Figure 1B:
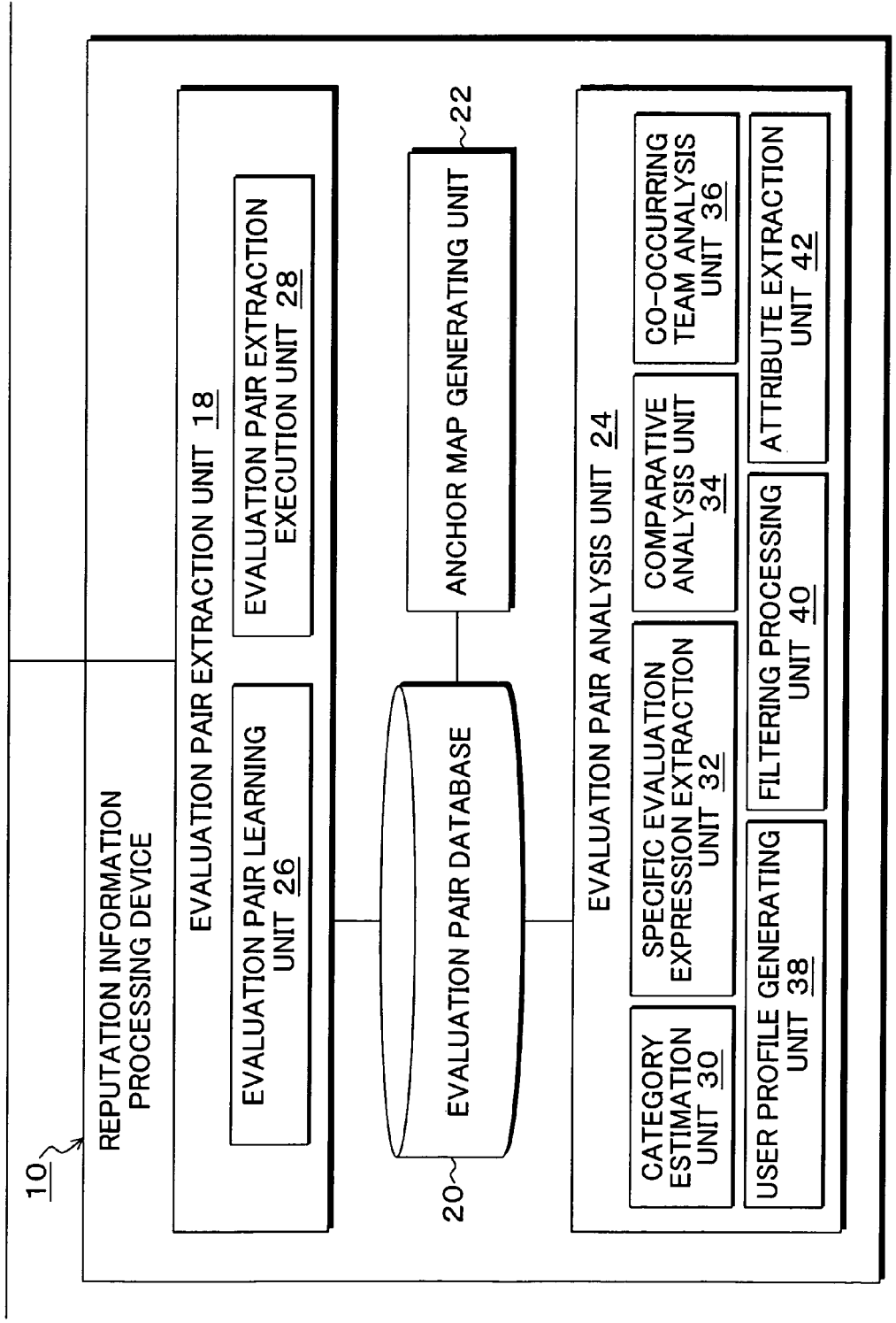
FIG. 1 is a block diagram showing an embodiment of apparatus functions realized by a reputation information processing program of the present invention.

FIG. 1 is a block diagram showing an embodiment of apparatus functions realized by a reputation information processing program of the present invention. In FIG. 1, a reputation information processing apparatus 10 of the present invention can access web servers 14-1 to 14-4 via a network 12 such as the Internet, obtains text documents 16-1 to 16-4 which are on the web servers 14-1 to 14-4 and written by users, extracts reputation information from the text documents 16-1 to 16-4, and analyze the extracted reputation information. In the reputation information processing apparatus 10, an evaluation pair extraction unit 18, an evaluation pair database 20, an anchor map generating unit 22, and an evaluation pair analysis unit 24 are provided. In the present embodiment, an evaluation pair is defined as a set in which an object and an evaluation pair are combined. The object refers to a unique object such as a product name or a name of a maker which can be evaluated. The evaluation expression refers to a phrase expressing evaluation which serves as an opinion with respect to an object of a user like "like" or "hard to use". An evaluation pair learning unit 26 and an evaluation pair extraction executing unit 28 are provided in the evaluation pair extraction unit 18. The evaluation pair learning unit 26 provides evaluation pairs extracted from a model document for training to a machine learner, so as to cause it to learn rules that can serve as evaluation pairs. The evaluation pair extraction executing unit 28 inputs unknown documents to the machine learner, extracts evaluation pairs based on the learnt rules, and register them in the evaluation pair database 20. A large quantity of evaluation pairs has to be extracted with high accuracy for analysis of evaluation information. In the present embodiment, in order to extract evaluation pairs, evaluation pairs are extracted in high accuracy from a wide range by use of the machine learner. In extraction of evaluation pairs using the machine learner, when a document to which information of evaluation pairs is given in advance by the evaluation pair learning unit 26 is provided to the machine learner, and the machine learner is caused to learn rules that can serve as evaluation pairs, an evaluation pair sorting model is generated. The evaluation pair extraction executing unit 28 extracts evaluation pairs from unknown documents by use of the evaluation pair learnt model which is a learnt rule generated by the evaluation pair learning unit 26, and registers them in the evaluation pair database 20. As the machine learner used by the evaluation pair extraction unit 18 of the present embodiment, for example, an existing technique such as Boosting can be applied. Moreover, in extraction of evaluation pairs, objects have to be extracted from an object document, and unique expression extraction and noun phrase identification is used in extraction of the objects in addition to a dictionary. Extracted phrases are treated as objects by means of the noun expression extraction and the noun phrase identification. In addition, when evaluation expressions are to be extracted from the object document, an evaluation expression dictionary is used. In the evaluation expression dictionary, positive evaluation expressions such as "good" and "beautiful", negative evaluation expressions such as "hard to use" and "inconvenient", and evaluation expressions other than that are registered in advance. The anchor map generating unit 22 reads evaluation pairs, which are sorted in for example, category units, from the evaluation pair database 20 in which evaluation pairs extracted from the evaluation pair extraction unit 18 are registered and displays an anchor map necessary for visual mining of reputation information, for example, by expressing the appearing number of evaluation expressions by an anchor map with respect to objects by fixing the objects as anchors or expressing the appearing number of objects by an anchor map wherein evaluation expressions serve as anchors. In the evaluation pair analysis unit 24, a category estimation unit 30, a specific evaluation expression extraction unit 32, a comparative analysis unit 34, a co-occurring term analysis unit 36, a user profile generating unit 38, a filtering processing unit 40, and an attribute extraction unit 42 are provided. In the evaluation pair analysis unit 24, a wide variety of analysis is performed by utilizing evaluation pairs of combinations of evaluation expressions and objects registered in the evaluation pair database 20. In the present embodiment, the following analysis is performed by the functions of the category estimation unit 30, the specific evaluation expression extraction unit 32, the comparative analysis unit 34, the co-occurring term analysis unit 36, the user profile generating unit 38, and the filtering processing unit 40 provided in the evaluation pair analysis unit 24.

(1) Category estimation of objects according to the types of evaluation expressions (2) Extraction of evaluation expressions specific to particular objects (3) Comparison of degree of evaluation expressions (4) Analysis by means of co-occurring terms (note that co-occurring terms are defined as phrases which appear very often in documents which serve as causes or reasons of evaluation expressions of objects of evaluation pairs).

(5) Generation of user profiles (6) Filtering of commerce sites and spam blog

Furthermore, in the attribute extraction unit 42, extraction of attributes which are considered as important information for analysis of reputation information is performed. For example, attributes with respect to an object "movie" include "casting", "music", "story", etc. and attributes with respect to an object "personal computer" include "CPU speed", "memory capacity", "HDD capacity", etc.; however, conventionally, these attributes had to be collected by man-made operations. In the present invention, automatic extraction of attributes can be performed by use of, for example, co-occurring terms, combinations of evaluation pairs, and extension of matching registration contents of an evaluation expression dictionary. The automatic extraction of attributes in the present invention employs, for example, the following three methods.

(1) Extraction of attributes according to co-occurring terms (2) Extraction of attributes according to combinations of evaluation pairs (3) Extraction of attributes according to extension of evaluation expressions, a dictionary, and a matching function Details of the evaluation pair extraction unit 18 and the evaluation pair analysis unit 24 provided in the reputation information processing apparatus 10 will be further elucidated in the later description.

Figure 2:
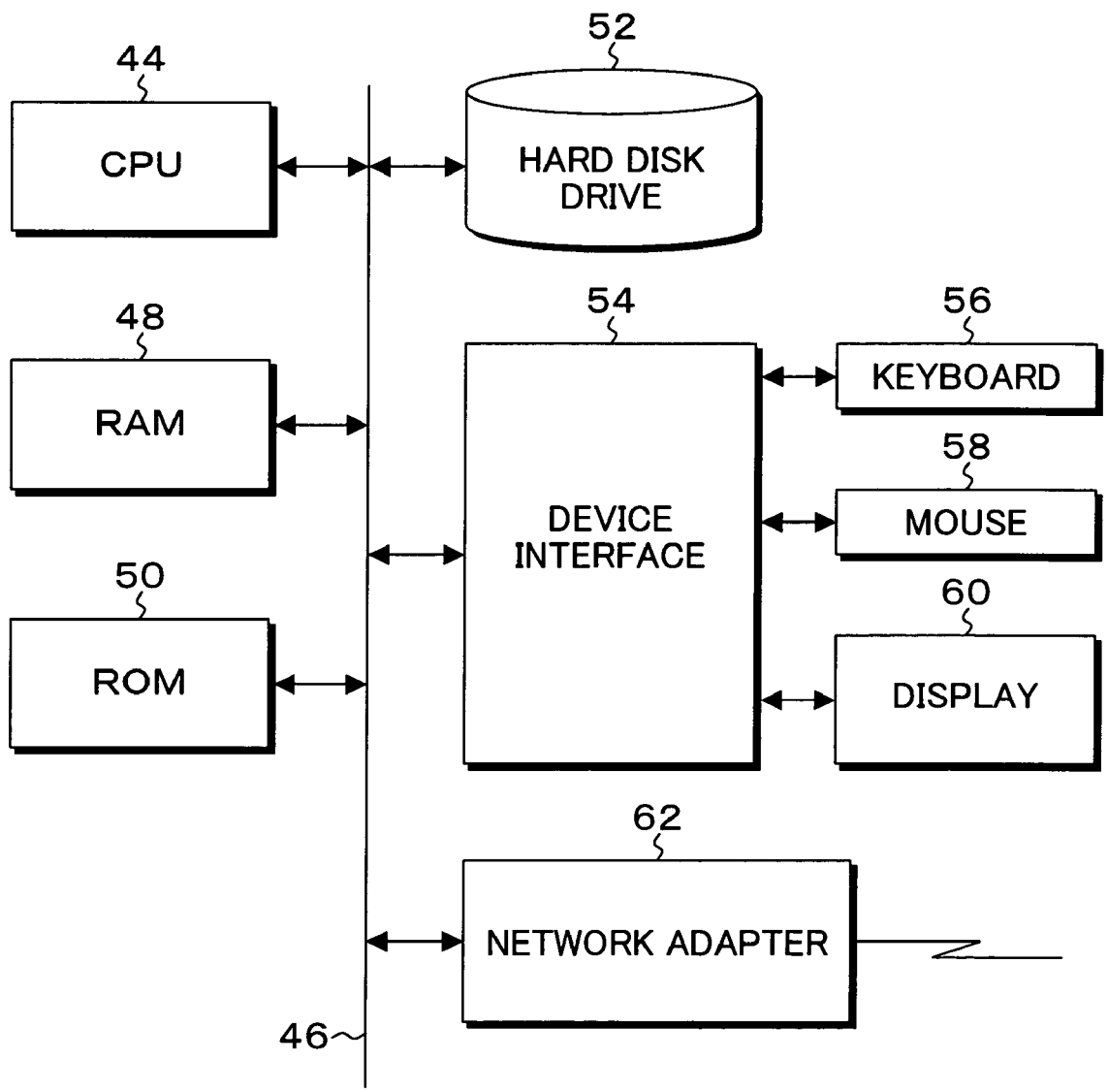
FIG. 2 is a block diagram of a hardware environment of a computer used in the present embodiment.

FIG. 2 is a block diagram of a hardware environment of a computer used in the present embodiment. In FIG. 2, on a bus of a CPU 44 provided are a RAM 48; a ROM 50; a hard disk drive 52; a apparatus interface 54 connecting a keyboard 56, a mouse 58, and a display 60; and a network adapter 62. A reputation information processing program of the present embodiment is stored in the hard disk drive 52; and, when the computer is started up, after deployment of an OS to the RAM 48 subsequent to the boot-up, it is read out from the hard disk drive 52 onto the RAM 48 and executed by the CPU 44.

Figure 3:
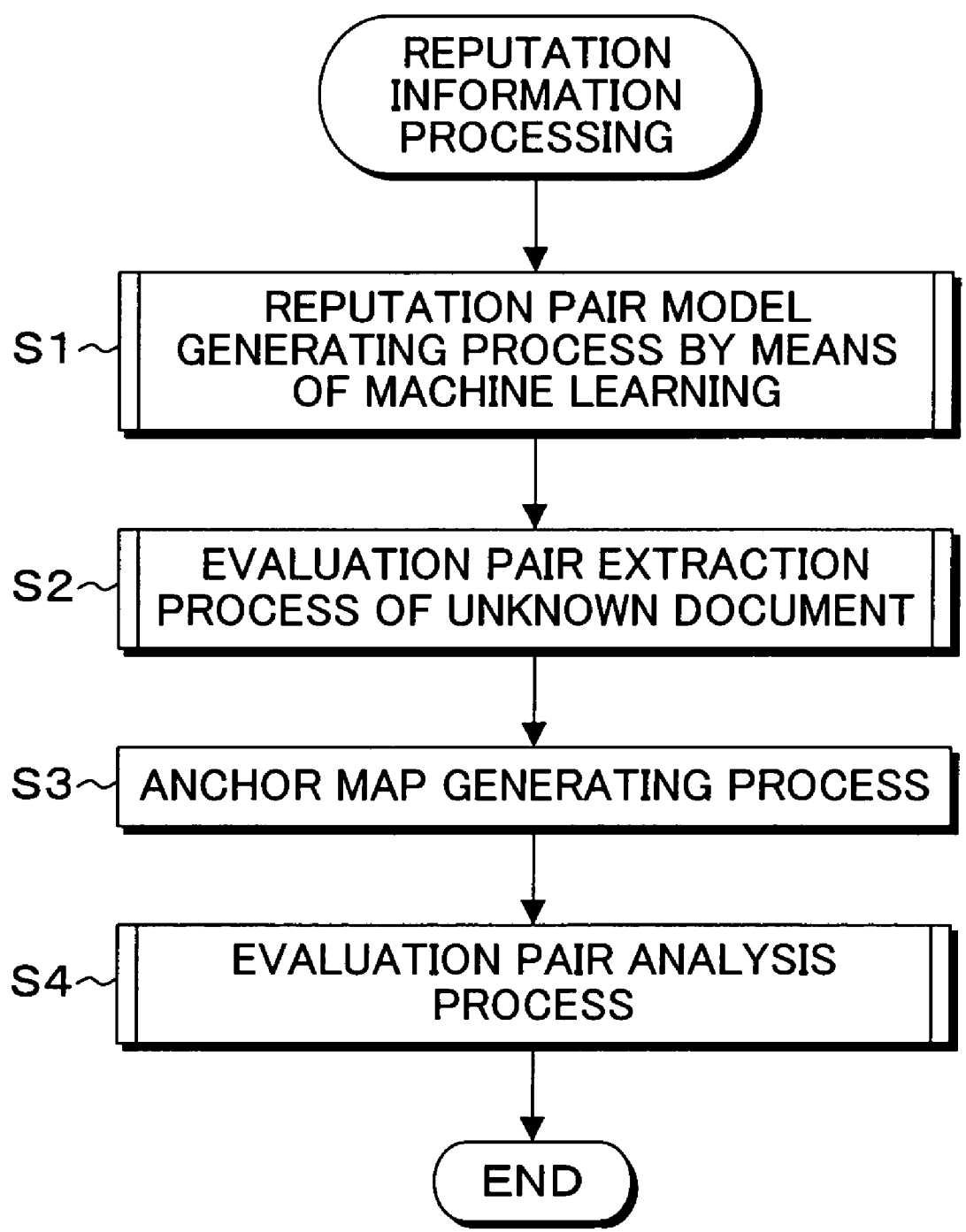
FIG. 3 is a flow chart of a basic procedure of a reputation information process according to the present embodiment.

FIG. 3 is a flow chart of a basic procedure of a reputation information process according to the present embodiment, which will be as the following when described with reference to FIG. 1. In FIG. 3, in step S1, the evaluation pair learning unit 26 gives evaluation pairs, which have been extracted from a model document for training, to the machine learner so as to cause it to learn rules that can serve as evaluation pairs. Subsequently, in step S2, text documents such as web pages on the Internet are input to the machine learner as unknown documents, and evaluation pairs are automatically extracted based on the rules learnt in step S1 and registered in the evaluation pair database 20. In step S3, in accordance with needs, in the anchor map generating unit 22, with respect to a collection of evaluation pairs registered in the evaluation pair database 20, either the objects or the evaluation expressions of the evaluation pairs are fixed as anchors to generate and display an anchor map. Furthermore, in step S4, the evaluation pair analysis unit 24 executes a wide-variety of analysis processes of reputation information by utilizing automatically collected evaluation pairs registered in the evaluation pair database 20.

Figure 4:
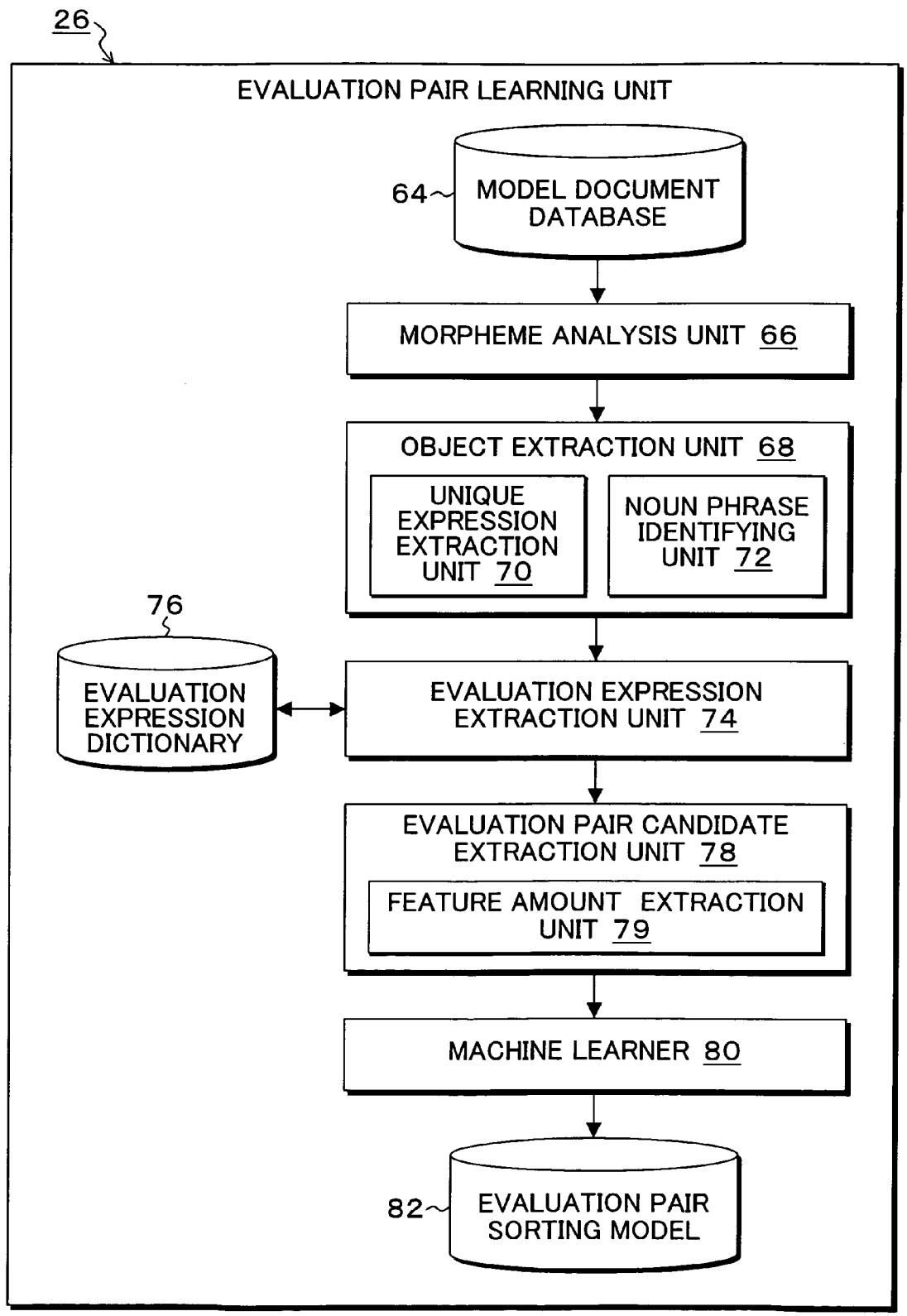
FIG. 4 is a block diagram showing details a functional configuration of the evaluation pair learning unit of FIG. 1.

FIG. 4 is a block diagram showing details of the evaluation pair learning unit 26 of FIG. 1. In FIG. 4, the evaluation pair learning unit 26 has a model document database 64, a morpheme analysis unit 66, an object extraction unit 68, an evaluation expression extraction unit 74, an evaluation expression dictionary 76, an evaluation pair candidate extraction unit 78, the machine learner 80, and a evaluation pair sorting model 82. Furthermore, a unique expression extraction unit 70 and a noun phrase identifying unit 72 are provided in the object extraction unit 68. In the evaluation pair learning unit 26 having this functional configuration, a model document in which objects and evaluation expressions and 'correct' or 'wrong' regarding the relation between both of them are provided is registered in the model document database 64, and training is performed by use of this model document The morpheme analysis unit 66 executes morpheme analysis with respect to the model document read out from the model document database 64 for training. The morpheme analysis of the model document is used when the model document is in a language in which words are continuous and not divided by spaces such as Japanese, Chinese, and Hangul. The process of the morpheme analysis 66 is not necessary for documents of the languages in which words are divided by spaces such as English and German. The object extraction unit 68 extracts objects such as product names and maker names from the model document. In extraction of objects, a process of extracting unique expressions according to the unique expression extraction unit 70 as objects and a process of extracting noun phrases according to the noun phrase identifying unit 72 as objects are performed. Furthermore, general nouns are extracted by use of a dictionary (not shown). The evaluation expression extraction unit 74 extracts, as evaluation expressions, phrases expressing evaluations such as "like" and "hard to use" which serve as opinions of users for the objects from the model document. Extraction of the evaluation expressions is performed by use of the evaluation expression dictionary 76. In the evaluation expression dictionary 76, positive evaluation expressions such as "like", "beautiful", and "great"; negative expressions such as "hackneyed", "regrettably", and "worst"; and, furthermore, other evaluation expressions that do not belong to any of them are registered in advance. Evaluation expressions are extracted in accordance with matching of the evaluation expressions registered in the evaluation expression dictionary 76 with phrases in the object document. The evaluation pair candidate extraction unit 78 generates evaluation pair candidates by combining objects extracted by the object extraction unit 68 and the evaluation expression extracted by the evaluation expressions extraction unit 74, extracts feature amounts for the generated evaluation pair candidates, sets answers whether the combinations of the evaluation pair candidates are right or not, that is, correct or wrong, inputs the feature amounts and answers obtained for the evaluation pair candidates to the machine learner, and generates an evaluation pair sorting model which is a learnt result of the rules that can serve as evaluation pairs. Herein, the feature amounts extracted for the evaluation pair candidates include, for example, (1) distance between an evaluation expression and an object
(2) type of the evaluation expression and the object
(3) phrases around the evaluation expression and the object;

wherein a plurality of feature amounts f1, f2, f3, . . . fn is obtained, and "answers" to the feature amount f1 to fn which are known in advance are set. Herein, as the answers to the feature amounts, "correct" is set if a combination of an object and an evaluation expression in an evaluation pair candidate is right, and "wrong" is set if it is wrong. In this case, for example, "correct" is represented by "1" and "wrong" is represented by "0".

As an example, when feature amounts f1, f2, f2, f3, . . . fn are obtained for an evaluation pair of an object and an evaluation expression, and correct is set for the evaluation pair, the relation between the feature amounts and the correct will be represented by $\{(f1, f2, f3, \ldots fn), (correct)\}$.

For example, when the feature amounts f1 to fn are represented by 0, 1 corresponding to existence and nonexistence, it can be represented as $\{(1101 \ldots 0), (1)\}$. The relation between the feature amounts and answers extracted for the evaluation pair candidate in the above described manner is input to the machine learner, thereby generating weights w1, w2, . . . wn of the feature amounts for obtaining answers as an evaluation pair sorting model 82. The relation between the feature amounts f1 to fn and the weights w1 to wn obtained through learning is provided by, for example, the following expression as a score S of the feature amounts showing whether the evaluation pair is correct or wrong.

$$S = w1 \cdot f1 + w2 \cdot f2 + \ldots + wn \cdot fn \quad (1)$$

Herein, if the calculated score S exceeds a predetermined threshold value, it is assumed to be correct "1", and if it is equal to or less than the threshold value, it is assumed to be wrong "0". Therefore, in the learning process, since the feature amounts f1 to fn are already known, and the answers based on the score S are also known as correct "1" or wrong "0", both of them are input to the machine learner to determine through learning the values of the weights w1 to wn which are the rules that can serve as evaluation pairs, and the determined weights w1 to wn are registered as the evaluation pair sorting model 82. In the above description, in order to simplify the explanation about the feature amounts, the feature amounts are treated as binary values of 0 or 1 which are compared with threshold values and representing the presence of the feature amounts; however, the feature amounts can be certainly treated as continuous analogue amounts.

FIGS. 5A, 5B and 5C are explanatory diagrams of the evaluation pair learning process of FIG. 4 in which a Japanese model document serves as an object. In FIGS. 5A and 5B, a model document 84 for training describes an opinion when a user saw a movie "Phantom of the Opera". With respect to the model document 84, a morpheme analysis document 88 is generated by a morpheme analysis process 86. The morpheme analysis process 86 is a process of dividing the document into words by separating it as shown by "/". Then, an object extraction process 90 is executed with respect to the morpheme analysis document 88. In the object extraction process 90, in addition to usage of the dictionary for extracting general nouns, a unique expression extraction process and a noun phrase identifying process are executed in the present embodiment. In an object extracted document 92 obtained by execution of the object extraction process 90, for example, "Phantom of the Opera" as an object 94 and "Phantom" as an object 96 are extracted.

Subsequently, an evaluation expression extraction process 98 of FIG. 5C is executed. In the evaluation expression extraction process 98, matched evaluation expressions are extracted from the morpheme analysis document 88 of FIGS. 5A and 5B by utilizing the evaluation expression dictionary 76 shown in FIG. 4, and an evaluation expression extraction list 100 is generated. In this example, in the evaluation expression extraction list 100, for example, "ok", "interesting", "great", and "hackneyed" are extracted as evaluation expressions 102, 104, 106, and 108. Then, an evaluation pair candidate extraction process 110 is executed. In the evaluation pair candidate extraction process 110, the evaluation expressions 102 to 108 of the evaluation expression extraction list 100 of FIG. 5C are combined with the objects "Phantom of the Opera" and "Phantom" obtained from the object extracted document 92 of FIGS. 5A and 5B, thereby extracting evaluation pair candidates 114-1 to 114-4 and evaluation pair candidates 116-1 to 116-4. Herein, the evaluation pair candidates 114-1 to 114-4 have the same object 94 "Phantom of the Opera", and the evaluation expressions combined therewith are different evaluation expressions 102 to 108. With respect to the evaluation pair candidates 116-1 to 116-4, the object 96 is the same "Phantom", and the evaluation expressions 102 to 108 are different. Then, a feature amount extraction process 118 is executed. In the feature amount extraction process 118, feature amounts 122 and answers 124 are obtained for the evaluation pair candidates 114-1 to 114-4 and 116-1 to 116-4 in the evaluation pair candidate list 112. For example, when the evaluation pair 114-1 is taken as an example, feature amounts f1 to fn of, for example, a distance f1 between the evaluation expression, the object and a type f2 of the evaluation expression and the object, and +1 indicating that an answer 124 thereof is correct are set. When {feature amounts f1 to fn, correct/wrong} of each of such evaluation pair candidates 114-1 to 114-4 and 116-1 to 116-4 in the feature amount extraction list 120 is input to the machine learner by a learning process 126 and it is caused to learn them, values of the weights w1, w2, w3, . . . wn used in the score calculation of the expression (1) is generated as a sorting model 128.

Figure 6:
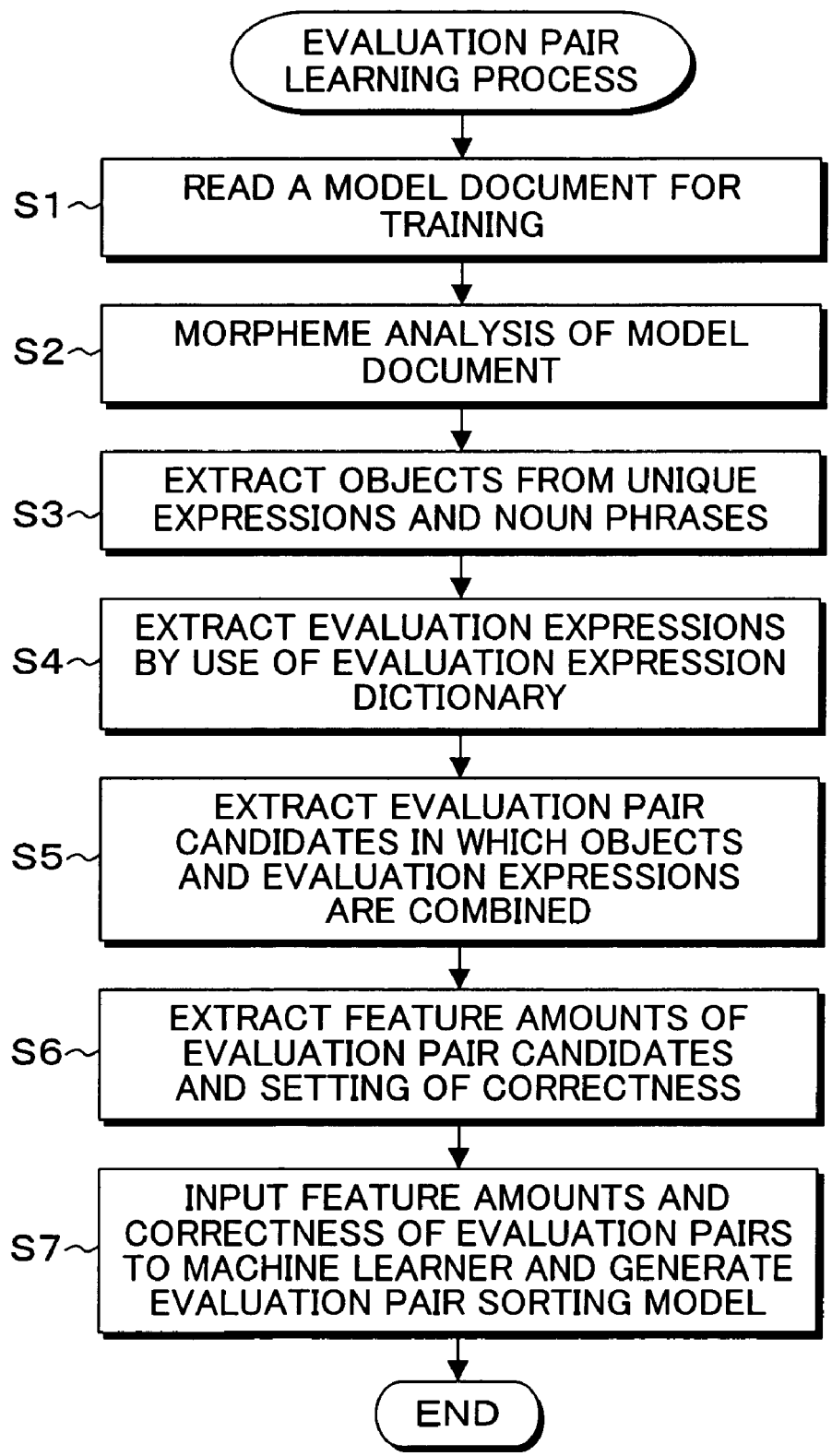
FIG. 6 is a flow chart of an evaluation pair learning process of FIG. 4.

FIG. 6 is a flow chart of the evaluation pair learning process of FIG. 4. In FIG. 6, in the evaluation pair learning process, in step S1, the model document for training is read from the model document database 64; and, in step S2, the morpheme analysis unit 66 performs morpheme analysis of the model document. Subsequently, in step S3, the object extraction unit 68 extracts objects from unique expressions and noun phrases; and, in step S4, the evaluation expression extraction unit 74 extracts evaluation expressions by use of the evaluation expression dictionary 76. Subsequently, in step S5, evaluation pair candidates in which objects and evaluation expressions are combined are extracted by the evaluation pair candidate extraction unit 78; in step S6, the feature amounts f1 to fn and correct or wrong are imparted to the evaluation pair candidates; and then, in step S7, sets of feature amounts and correct or wrong are input to the machine learner, and, for example, weights w1 to wn used in score calculation for obtaining whether the evaluation pairs are correct or wrong are obtained by learning, thereby generating an evaluation sorting model.

Figure 7B:
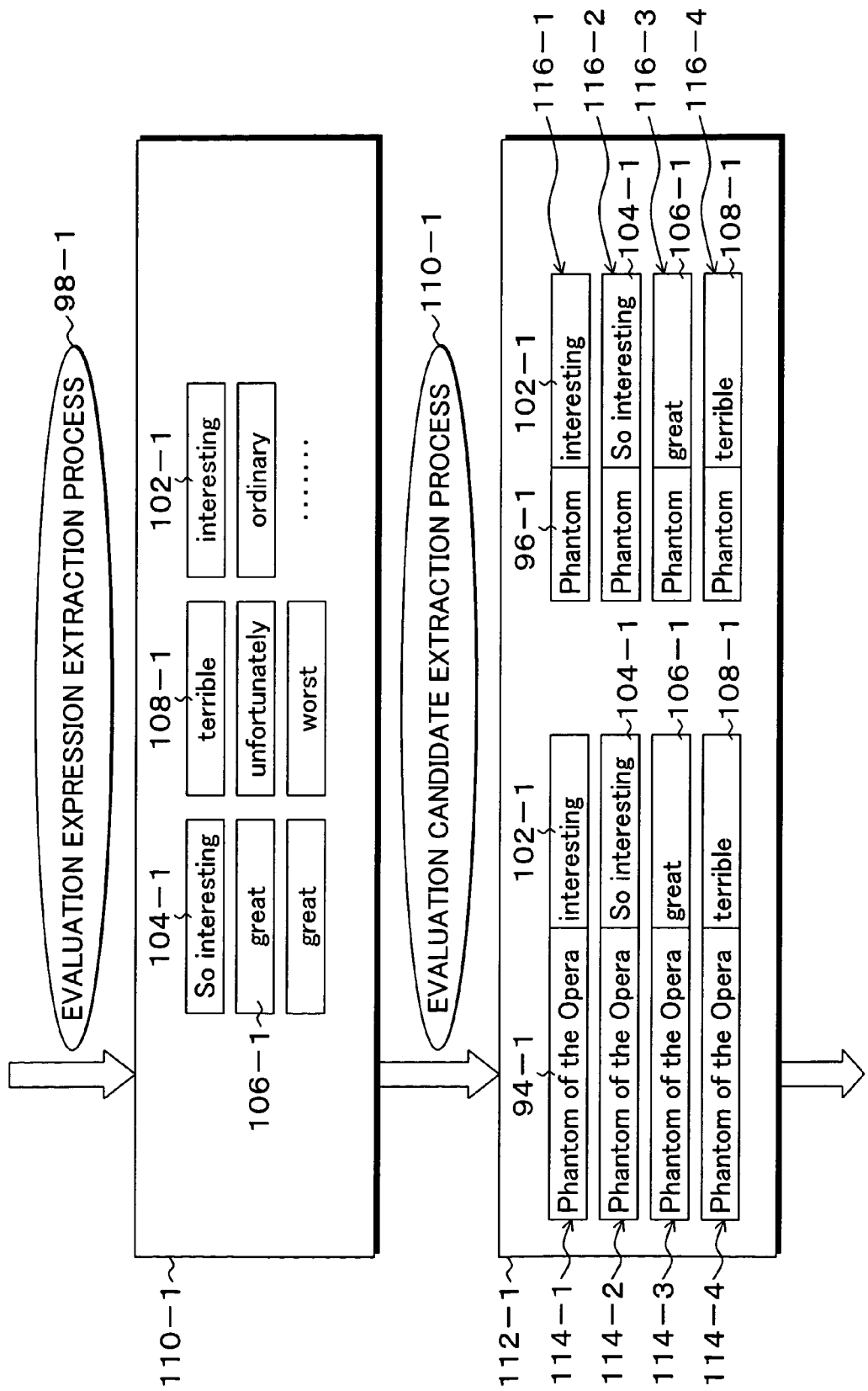
FIGS. 7B and 7C are explanatory diagrams of an evaluation expression extraction process, an evaluation pair candidate extraction process, a feature amount extraction process, and a learning process of FIG. 4 subsequent to FIG. 7A.
Figure 7C:
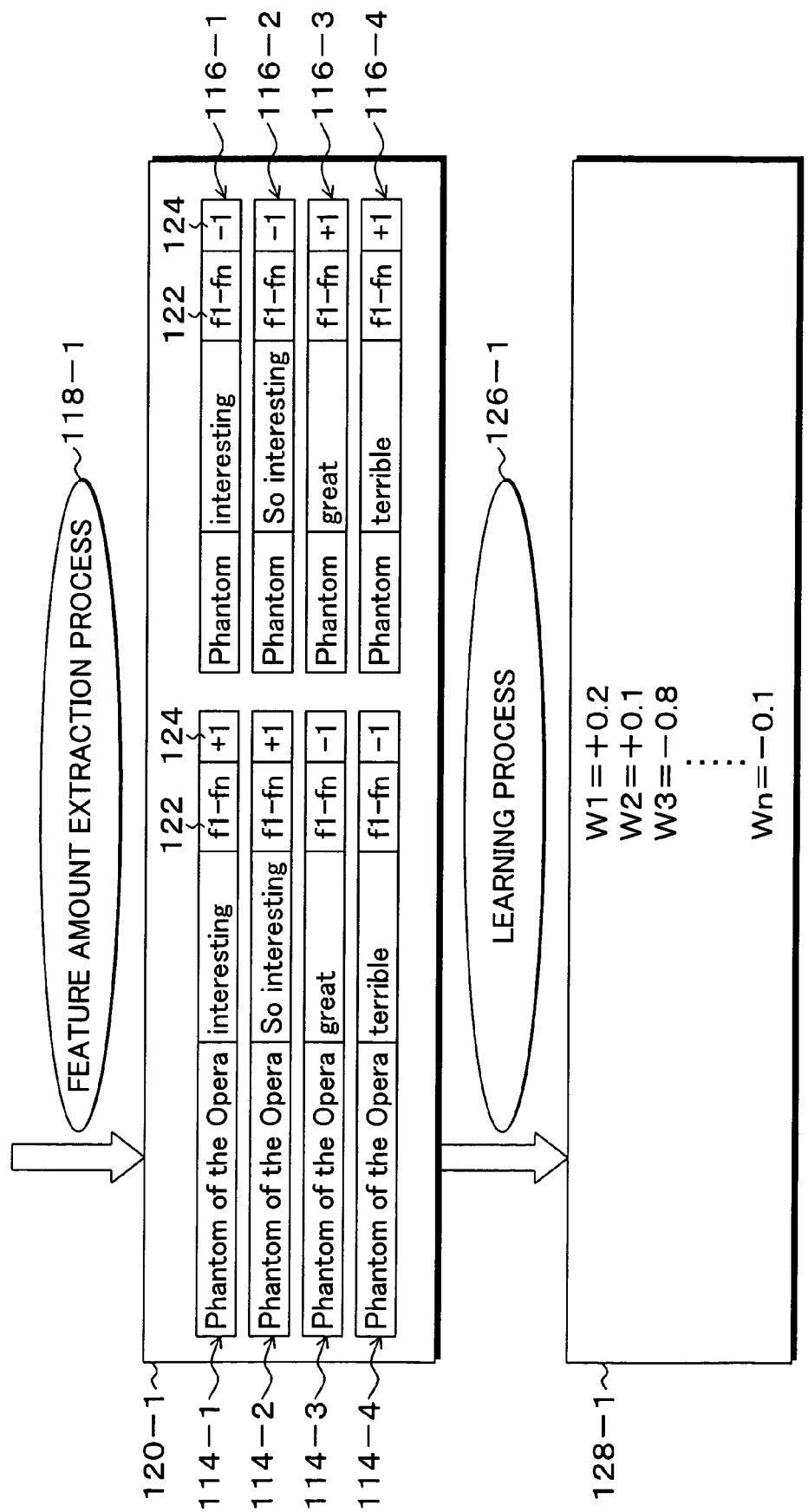

FIGS. 7A, 7B and 7C are explanatory diagrams of a process of the evaluation pair learning unit 26 of FIG. 4 in which an English document serves as a model document. In FIG. 7A, an English model document 84-1 in which the relation between objects and evaluation expressions is specified is input as a model document 84-1 for training. The English model document 84-1 describes an opinion when the user same as that of the Japanese model document of FIGS. 5A and 5B saw the movie "Phantom of the Opera". With respect to the input English model document 84-1, an object extraction process 90-1 is executed by the next object extraction unit 68 without performing morpheme analysis by the morpheme analysis unit 66, since words are separated by spaces in the case of English. With respect to an accordingly obtained object extraction list 92-1, "Phantom of the Opera" as an object 94-1 and "Phantom" as an object 96-1 are extracted.

Subsequently, the process proceeds to an evaluation expression extraction process 98-1 of FIGS. 7B and 7C wherein, as shown in an evaluation expression extraction list 100-1, English evaluation expressions 102-1, 104-1, 106-1, 108-1, . . . are extracted. Subsequently, an evaluation pair candidate extraction process 110-1 is executed, thereby extracting evaluation pair candidates 114-1 to 114-4 and 116-1 to 116-4 as shown in an evaluation pair candidate list 112-1. Then, a feature amount extraction process 118-1 is performed, thereby setting, as shown in a feature amount extraction list 120-1, f1 to fn as feature amounts 122 and "+1" which is correct or "−1" which is wrong as answers 124 respectively for the evaluation pair candidates 114-1 to 114-4 and 116-1 to 116-4. Then, the sets of the feature amounts (f1 to fn) and correctness (+1 or −1) from the evaluation pairs of the feature amount extraction list 120-1 are input to the machine learner so as to cause it to learn through a learning process 126-1, and, since the score S can be obtained as an accumulation of multiplication of the weights w1 to wn of the feature amounts f1 to f3, the values of the weights w1 to wn of the feature amounts f1 to fn for obtaining the score S through learning are generated as sorting model 128-1. As described above, even when the processing object of reputation information is an English document, the evaluation pair learning process can be performed basically in the same manner as the case of a Japanese document.

Figure 8:
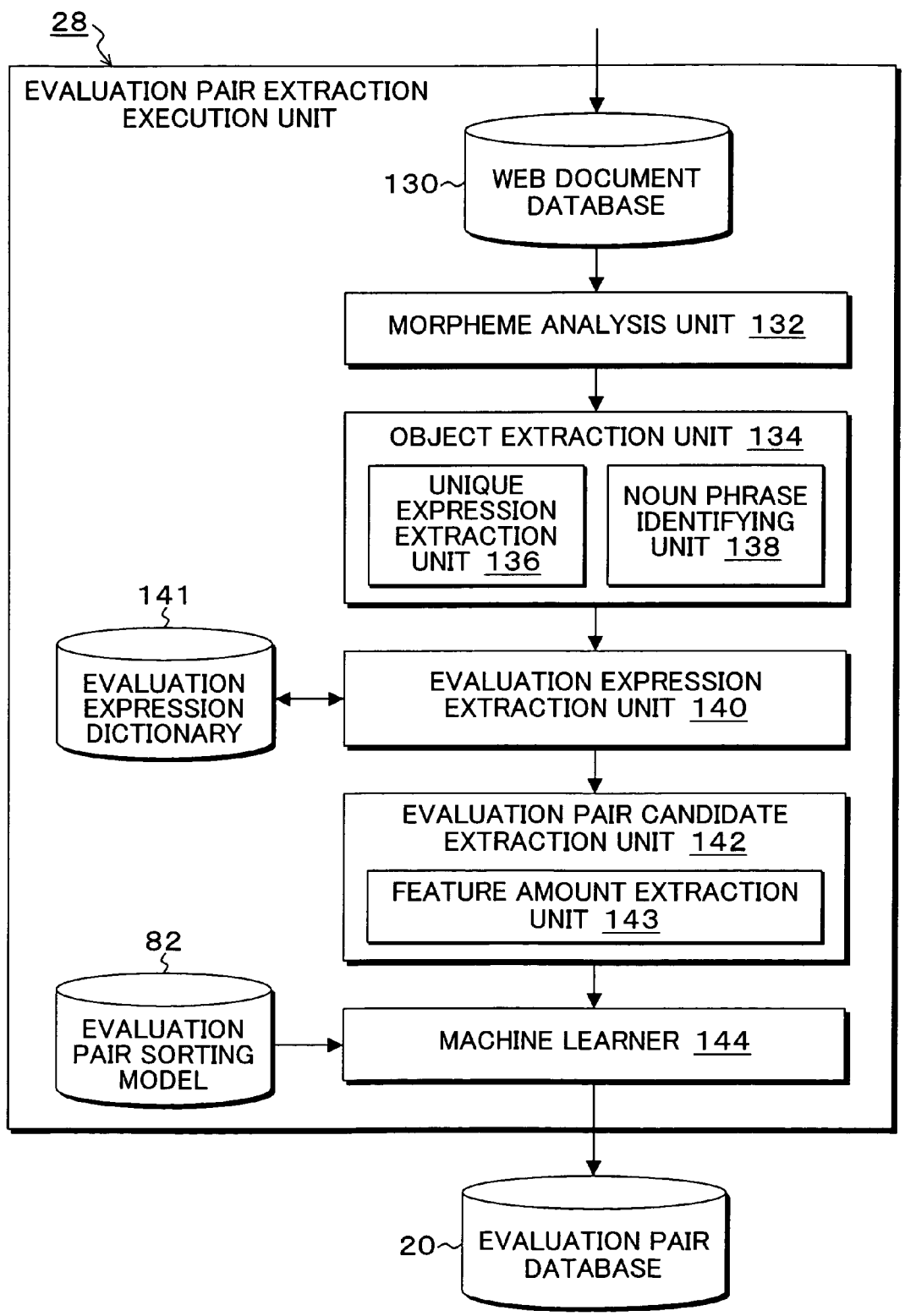
FIG. 8 is a block diagram showing details of a function configuration of the evaluation pair extraction execution unit of FIG. 1.

FIG. 8 is a block diagram showing details of the evaluation pair extraction execution unit 28 of FIG. 1. In FIG. 8, in the evaluation pair extraction execution unit 28, a web document database 130, a morpheme analysis unit 132, an object extraction unit 134, an evaluation expression extraction unit 140, an evaluation expression dictionary 141, an evaluation pair candidate extraction unit 142, a machine learner 144, and an evaluation pair sorting model 82 are provided. In the web document database 130, the text documents 16-1 to 16-4 collected from the web servers 14-1 to 14-4 on the network 12 shown in FIG. 1 are stored. The morpheme analysis unit 132, the object extraction unit 134, the evaluation expression extraction unit 141, the evaluation expression dictionary 142, and the evaluation pair candidate extraction unit 142 are same as the morpheme analysis unit 66, the object extraction unit 68, the evaluation expression extraction unit 74, the evaluation expression dictionary 76, and the evaluation pair candidate extraction unit 78 provided in the evaluation pair learning unit 26 of FIG. 4. In the evaluation pair extraction execution unit 28, an answer with respect to the feature amounts (f1 to fn) for each evaluation pair output from the evaluation pair candidate extraction unit 142 is an "unknown value". Meanwhile, learnt rules according to the evaluation pair sorting model 82 generated by the evaluation pair learning unit 26 of FIG. 4 are given to the machine learner 144, the score is calculated for the feature amounts of the evaluation pair by use of the learnt rules, and, if the score is larger than a predetermined threshold value, it is assumed to be correct and the evaluation pair candidate is registered in the evaluation pair database 20 as a correct evaluation pair. Meanwhile, if the score S of the evaluation pair candidate is equal to or less than the threshold value, it is discarded since it is wrong as an evaluation pair.

Figure 9A:
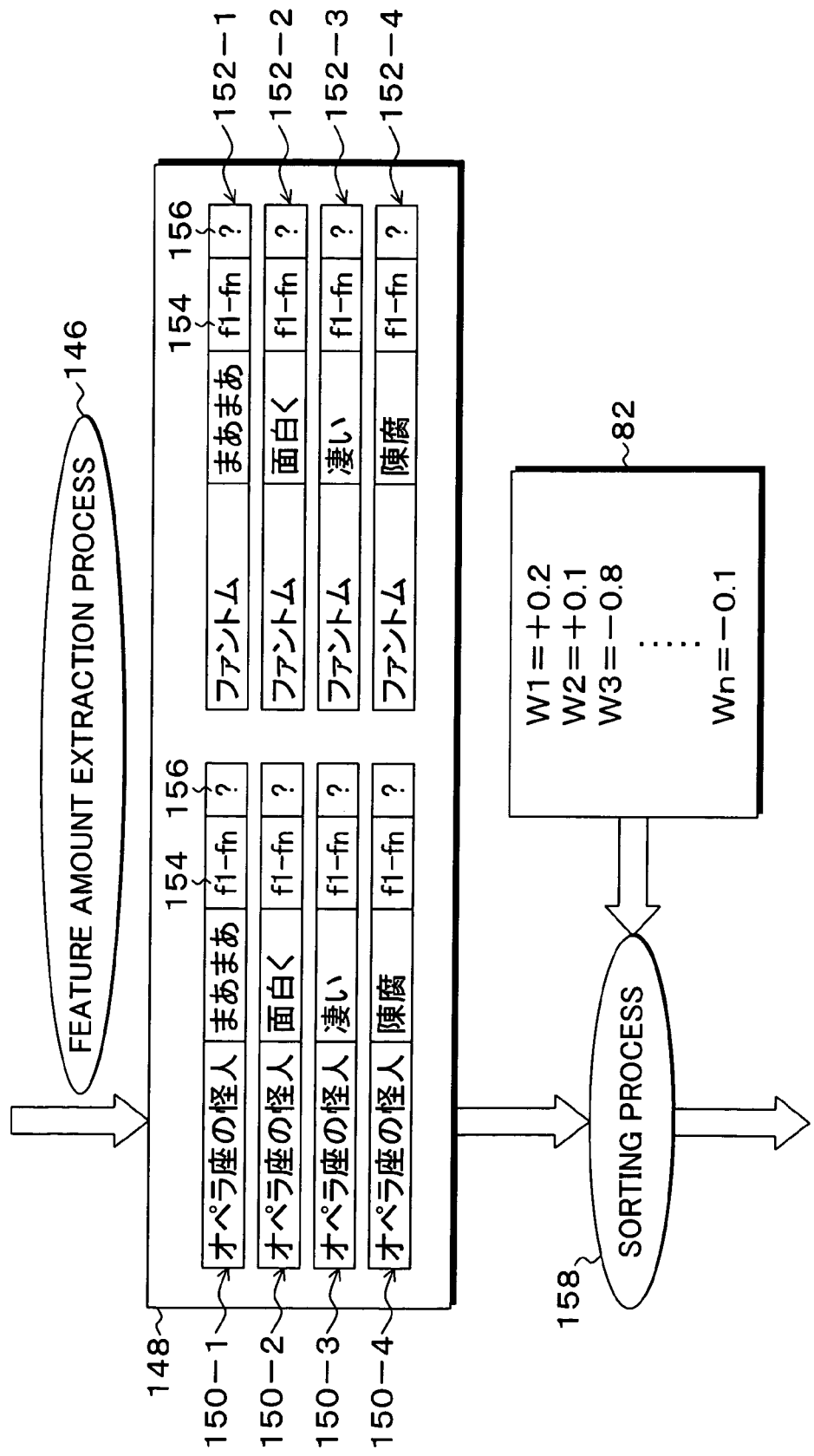

FIGS. 9A and 9B are explanatory diagrams of a processing operation of the evaluation pair extraction execution unit 28 of FIG. 8 with respect to a Japanese document; wherein, morpheme analysis, object extraction, and evaluation expression extraction are omitted since they are same as those of the evaluation pair learning unit 26 of FIG. 4, and a feature amount extraction process and a sorting process thereafter are shown. Moreover, as an unknown document to be processed by the evaluation pair extraction execution unit 28, in order to simplify explanation, a case in which the document same as the model document 84 used in the evaluation pair learning process of FIGS. 5A and 5B serve as an unknown document is employed as an example. In FIGS. 9A and 9B, after the unknown document same as the model document 84 of FIGS. 5A and 5B undergo morpheme analysis, object extraction, and an evaluation pair candidate extraction process, a feature amount extraction file 148 is generated by a feature amount extraction process 146. In the feature amount extraction file 148, with respect to evaluation pair candidates 150-1 to 150-4 and 152-1 to 152-4, (f1 to fn) are obtained as feature amounts 154; however, "correct" or "wrong" is unknown for correctness 156. Thereat, the feature amounts (f1 to fn) of each of the evaluation pairs 150-1 to 150-4 and 152-1 to 152-4 of the feature amount extraction file 148 are input to the machine learner, and the score calculation of the expression (1) using the evaluation pair sorting model 82 having the weights w1 to wn obtained through the evaluation pair learning is executed as a sorting process. A sorted list 160 is obtained through the sorting process; and, in the sorted list, a score 162 is calculated for each of the evaluation pairs 150-1 to 150-4 and 152-1 to 152-4. With respect to such sorted list 160, the score 162 is compared with a threshold value which has been determined in advance, for example, "0.0"; and it is determined to be correct "+1" if it exceeds the threshold value "0.0", or it is determined to be wrong "−1" if it is equal to or less than the threshold value "0.0". According to the determination with respect to the score whether it is correct or wrong, three evaluation pairs 150-1, 150-2, and 152-4 are correct "+1", and they are registered in an evaluation pair database 20-1 as evaluation pairs which are extracted from the unknown document and have correct combinations. In the evaluation pair database 20-1, objects 172, evaluation expressions 174, and scores 176 are registered. Herein, things to be registered in the evaluation pair database 20-1 are basically three, the objects 172, the evaluation expressions 174, and the scores 176; however, in order to perform various analysis utilizing the evaluation pair database 20-1, as shown in the evaluation pair database 20, an extension area 170 is further provided with respect to the objects 172, the evaluation expressions 174, the scores 176. As extension information of the extension area 170, for example, document IDs 178, evaluation expression IDs 180, URLs 182, and types 184 are provided. The document ID 178 is an ID representing a document from which an evaluation expression is extracted. The evaluation expression ID 180 is an ID added for each type of the evaluation expression 174. Note that, regarding "p, n, o" shown in parentheses of the evaluation expressions 174, "p" represents positive, "n" represents negative, and "o" represents others. The URL 182 represents a network address of a web page having the text document serving as an extraction object. Furthermore, the type 184 sets "unique noun (NE)" for objects extracted through unique expression extraction and noun phrase identification, and sets "general noun (NOUN)" for objects other than that. When extension information of the extension area 170 is added as the evaluation pair database 20 in addition to the objects, the evaluation expressions, and the scores, various analysis, which will be described below, utilizing evaluation pairs in the present embodiment can be performed.

Figure 10:
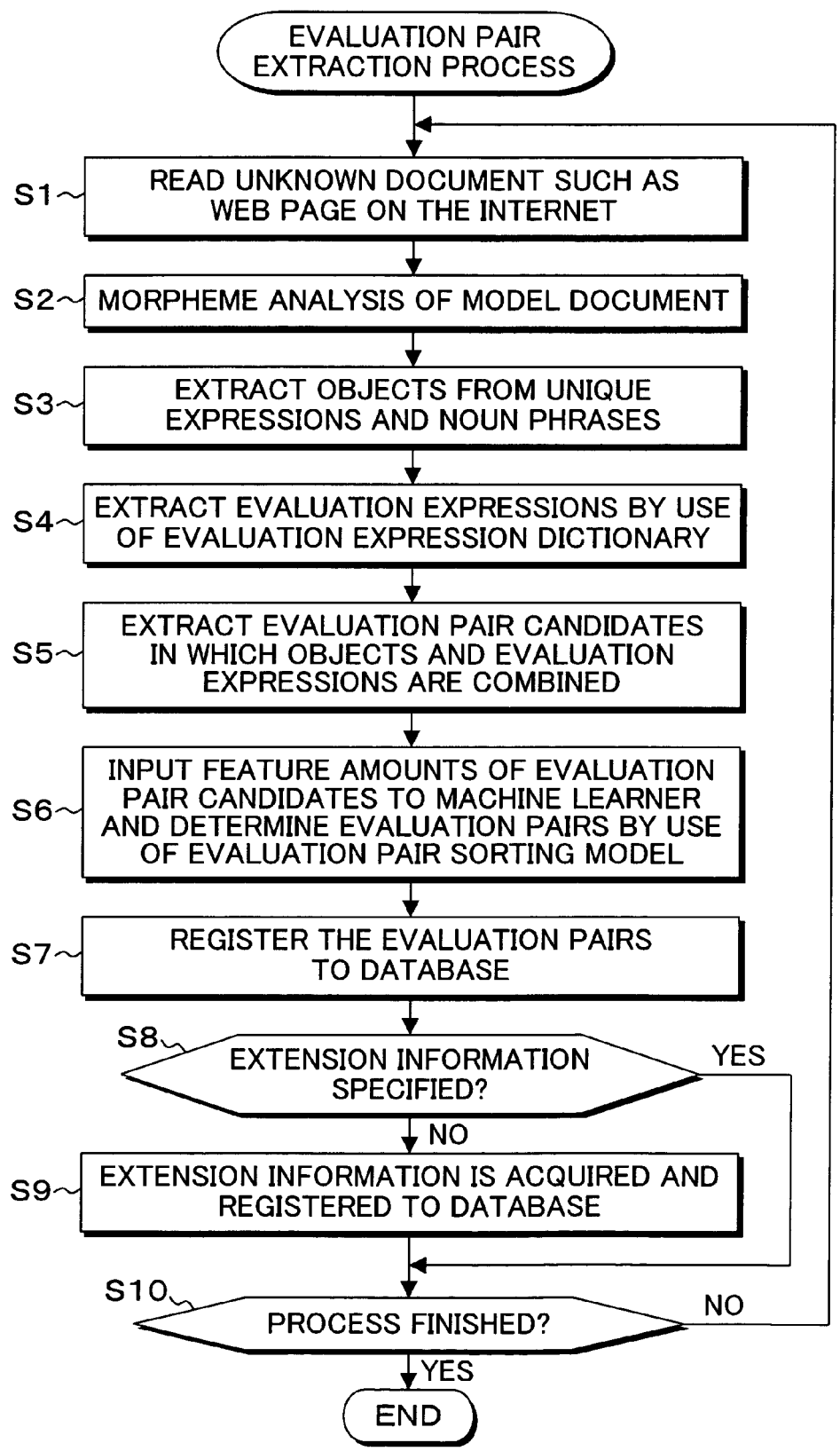
FIG. 10 is a flow chart of an evaluation pair extraction process of FIG. 8.

FIG. 10 is a flow chart of the evaluation pair extraction process of FIG. 8. In FIG. 10, in the evaluation pair extraction process, in step S1, an unknown document is read from the web document database 130 which stores unknown documents such as web pages on the Internet; if it is a Japanese document model, morpheme analysis is performed by the morpheme analysis unit 132 in step S2; and then, in step S3, objects are specified through unique expression extraction and noun phrase identification by the object extraction unit 134, and, regarding others, objects serving as general nouns are extracted by use of, for example, a dictionary. Then, in step S4, evaluation expressions are extracted from the document by the evaluation expression extraction unit 140 by use of the evaluation expression dictionary 141. Subsequently, in step S5, evaluation pair candidates in which the extracted objects and evaluation expressions are combined are extracted. Then, in step S6, feature amounts f1 to fn are extracted for the evaluation pair candidates and input to the machine learner with the answers thereof being "undetermined", evaluation pairs are obtained by use of the evaluation pair sorting model 82 obtained in the learning process, whether they are correct or wrong is determined by comparing the obtained scores with the threshold value, and, in step S7, the evaluation pair candidate which are determined to be correct are registered in the evaluation pair database 20 as extracted evaluation pairs. Subsequently, in step S8, whether extension information is specified or not is checked; and, if extension information is specified, in step S9, extension information shown in the extension area 170 of the evaluation pair database 20 of FIGS. 9A and 9B are registered. The processes of steps S1 to S9 are repeated until there is a process termination in step S10.

Figure 11A:
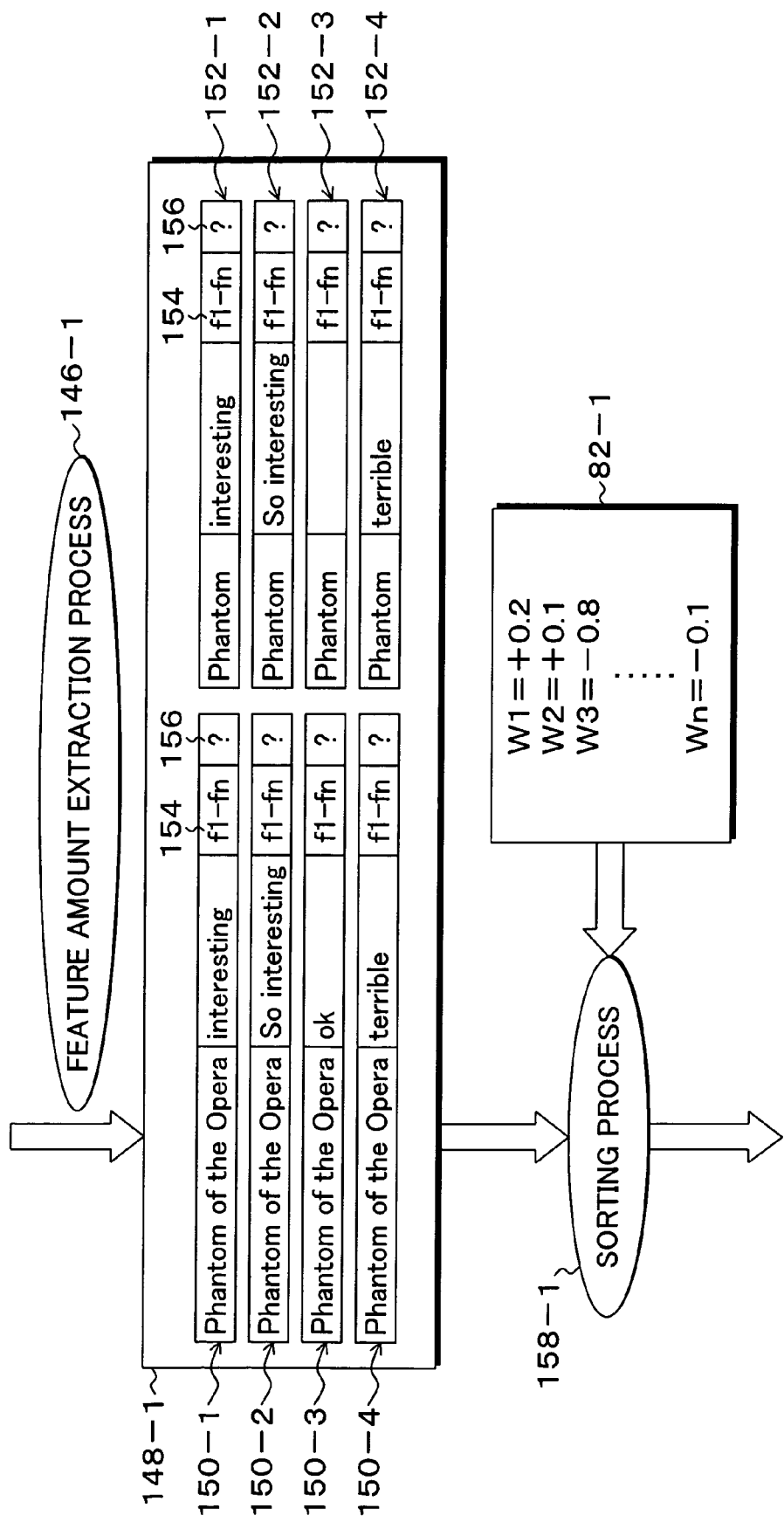

FIGS. 11A and 11B are explanatory diagrams of the evaluation pair extraction process of FIG. 8 wherein an English unknown document serves as an object. When it is an English document, the process performed by the morpheme analysis unit 132 is not required; therefore, it is started from the process performed by the object extraction unit 134, and, after evaluation expressions are extracted by the evaluation expression extraction unit 140, evaluation pair candidates in which the objects and the evaluation expressions are combined are extracted by the evaluation pair candidate extraction unit 142. The processes until the extraction of the evaluation pair candidates are omitted since they are same as the processes of the English document of the learning process shown in FIGS. 7A, 7B and 7C, and extraction of feature amounts performed by the evaluation pair candidate extraction unit 142 and a sorting process thereafter are focused on and shown. A feature amount extraction process 146-1 of an English document is basically same as the feature amount extraction process of FIGS. 9A and 9B for Japanese. In the evaluation pair database 20-1, three items, objects 172, evaluation expressions 174, and the scores 176 are registered, and, since it is an analysis process using evaluation pairs, the extension area 170 is added as shown in the evaluation pair database 20, wherein the document IDs 178, the evaluation expression IDs 180, the URLs 182, and the types 184 are provided.

Figure 12:
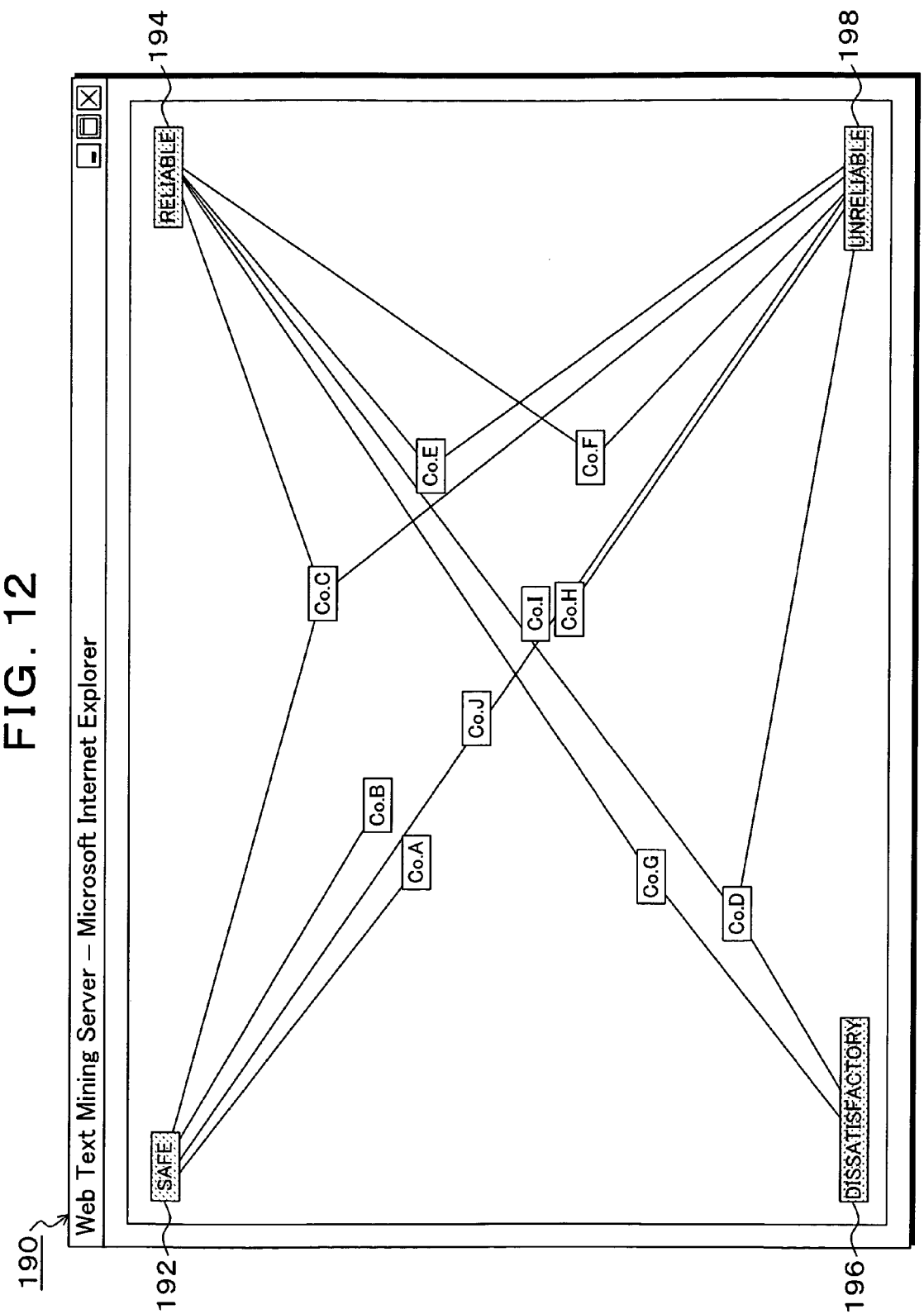
FIG. 12 is an explanatory diagram of an anchor map generated from the evaluation pair database by fixing evaluation expressions according to the present embodiment.

FIG. 12 is an explanatory diagram of an anchor map generated by utilizing the evaluation pair database of the present embodiment and fixing evaluation expressions of evaluation pairs as anchors. In FIG. 12, in an anchor map 190, four evaluation expressions "safe", "reliable", "dissatisfactory", and "unreliable" are fixed as anchors 192, 194, 196, and 198, and the frequencies of appearance of "Company A" to "Company J" which are objects combined with the four evaluation expressions are disposed on the map by, for example, weighted-center calculation with respect to the anchors 192 to 198.

Figure 13:
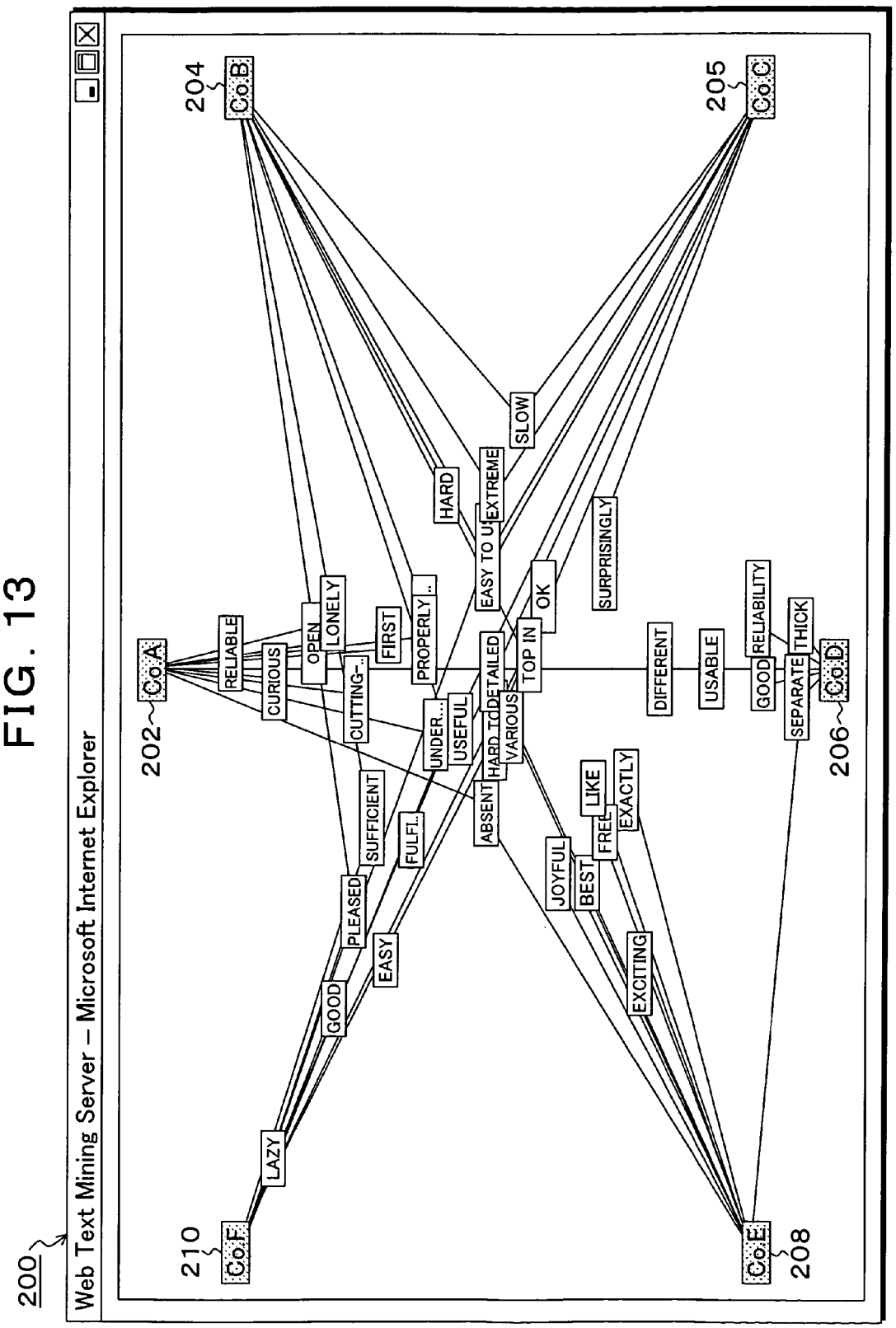
FIG. 13 is an explanatory diagram of an anchor map generated from the evaluation pair database by fixing objects according to the present embodiment.

In FIG. 13, with respect to the gathering of the evaluation pairs of the evaluation pair database 20, objects which are "Company A" to "Company F" are fixed as anchors 202 to 210, the number of appearance of the evaluation expressions combined with the objects "Company A" to "Company F" is obtained, and the evaluation expressions are disposed on an anchor map 200 by weighted-center calculated of the appearing number of the evaluation expressions with respect to the anchors 202 to 210. By means of the anchor map 190 of FIG. 11 or the anchor map 200 of FIG. 13, the evaluation pairs can be utilized as a visual mining tool for analysis or search. Next, a process of the category estimation unit 30 provided in the evaluation pair analysis unit 24 of the present embodiment will be described. In order to generate a circular graph 212 like that shown in FIG. 14 by utilizing the evaluation pairs registered in the evaluation pair database 20 so as to perform comparison between the objects, gathering of objects which belong to the same category is necessary.

Figure 14:
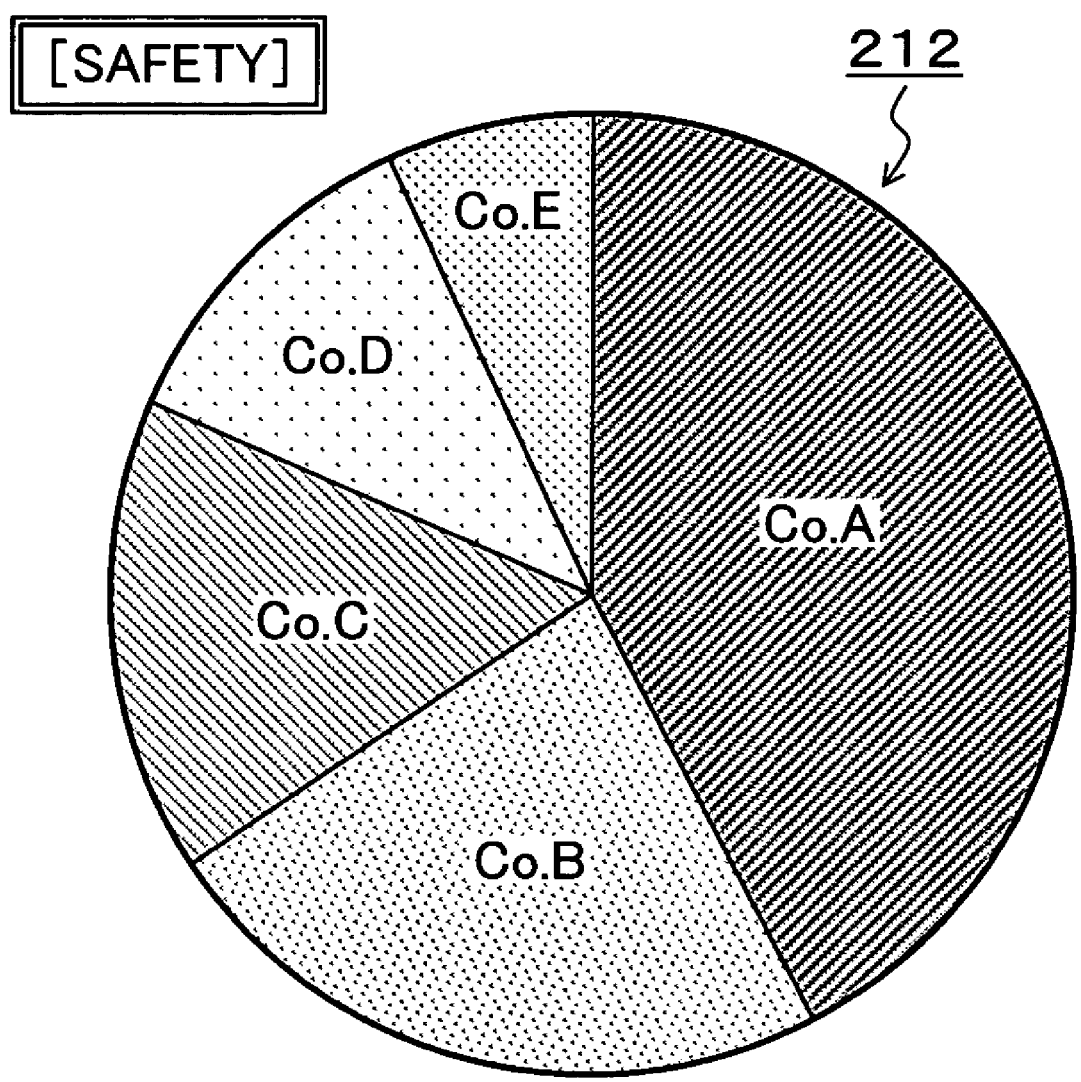
FIG. 14 is an explanatory diagram of a circular graph generated from category estimation result of evaluation pairs of the present embodiment.

The circular graph 212 of FIG. 14 shows distribution of the appearing numbers of companies of a case in which an evaluation expression "safe" is set for a company A, a company B, a company C, and a company D serving as objects. Thereat, in the present embodiment performed is a category sorting process in which the gathering of evaluation pairs registered in the evaluation pair database 20 is sorted into gatherings of evaluation pairs in category units. The sorting of the categories of the evaluation pairs can be estimated by using the evaluation expressions combined with the objects. For example, an evaluation expression "fast" is an expression evaluating a "car", but not an expression evaluating an object "food". On the other hand, an evaluation expression "delicious" is an expression evaluating an object "food", but not an expression evaluating an object "car". When the evaluation expressions used in the evaluation pairs are used in this manner, sorting of a category of evaluation pairs having objects that belong to cars and a category of evaluation pairs having objects corresponding to foods can be estimated.

Figure 15:
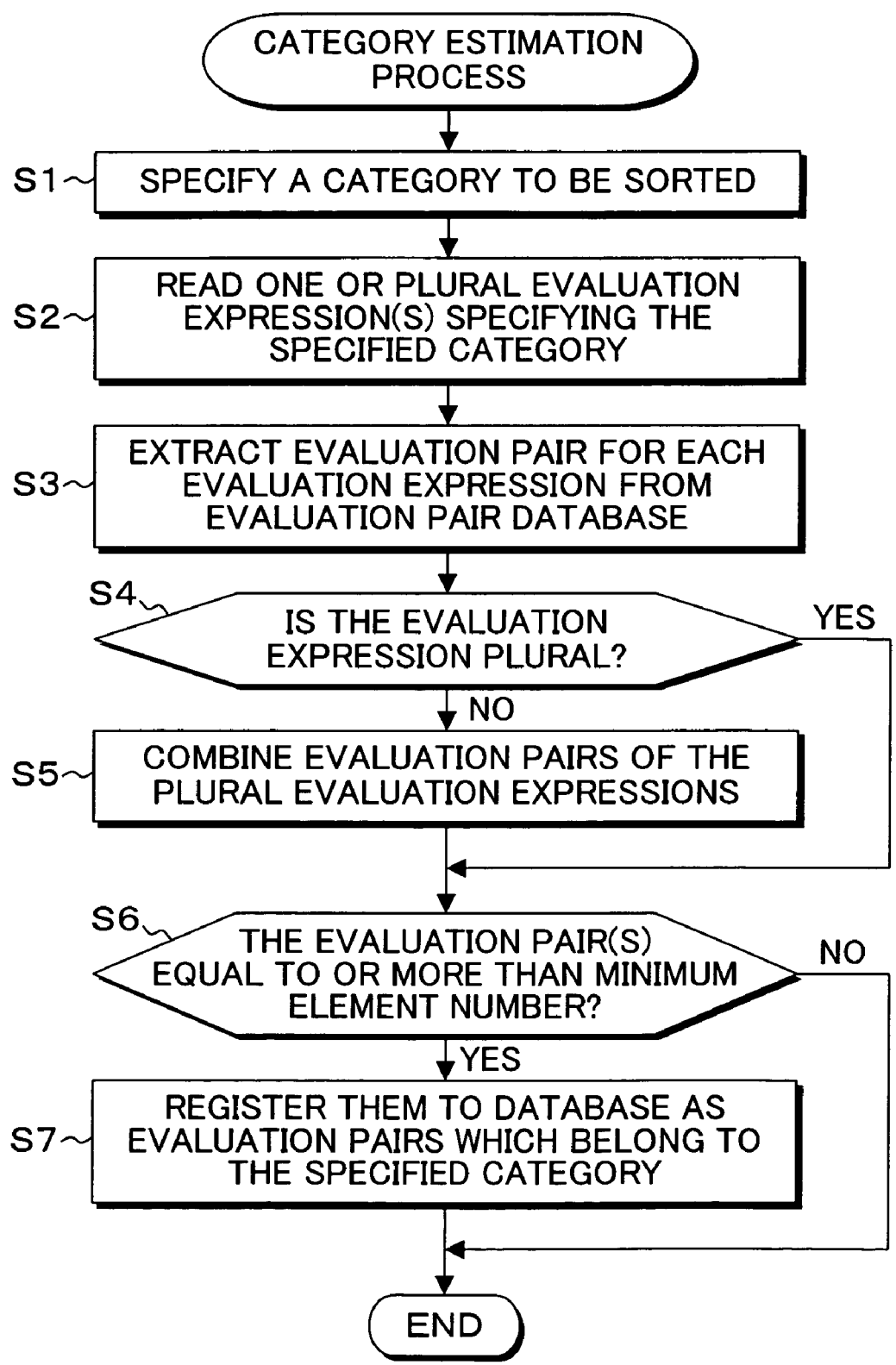
FIG. 15 is a flow chart of a category estimation process according to the present embodiment.

FIG. 15 is a flow chart of a category estimation process according to the present embodiment. In the category estimation process, a category to be sorted is specified in step S1. When the category is specified, in step S2, one or a plurality of evaluation expressions specifying the specified category is read. As the evaluation expressions corresponding to the category, a dictionary in which the corresponding relation between categories and evaluation expressions can be prepared in advance. Subsequently, in step S3, evaluation pairs are extracted for each read evaluation expression from the evaluation pair database 20 so as to generate a gathering of evaluation pairs. The evaluation pairs expressed for each evaluation expression is defined as a cluster. Subsequently, in step S4, if a plurality of the evaluation expressions has been input for specifying the specified category, the plurality of evaluation pairs are combined in step S5. For example, a cluster of evaluation pairs extracted by an evaluation expression "lovely" and a cluster of a gathering of evaluation pairs extracted by another evaluation expression "beautiful" are combined so as to extract evaluation pairs having two evaluation expressions "lovely" and "beautiful" for the same object of the cluster are extracted.

Figure 16:
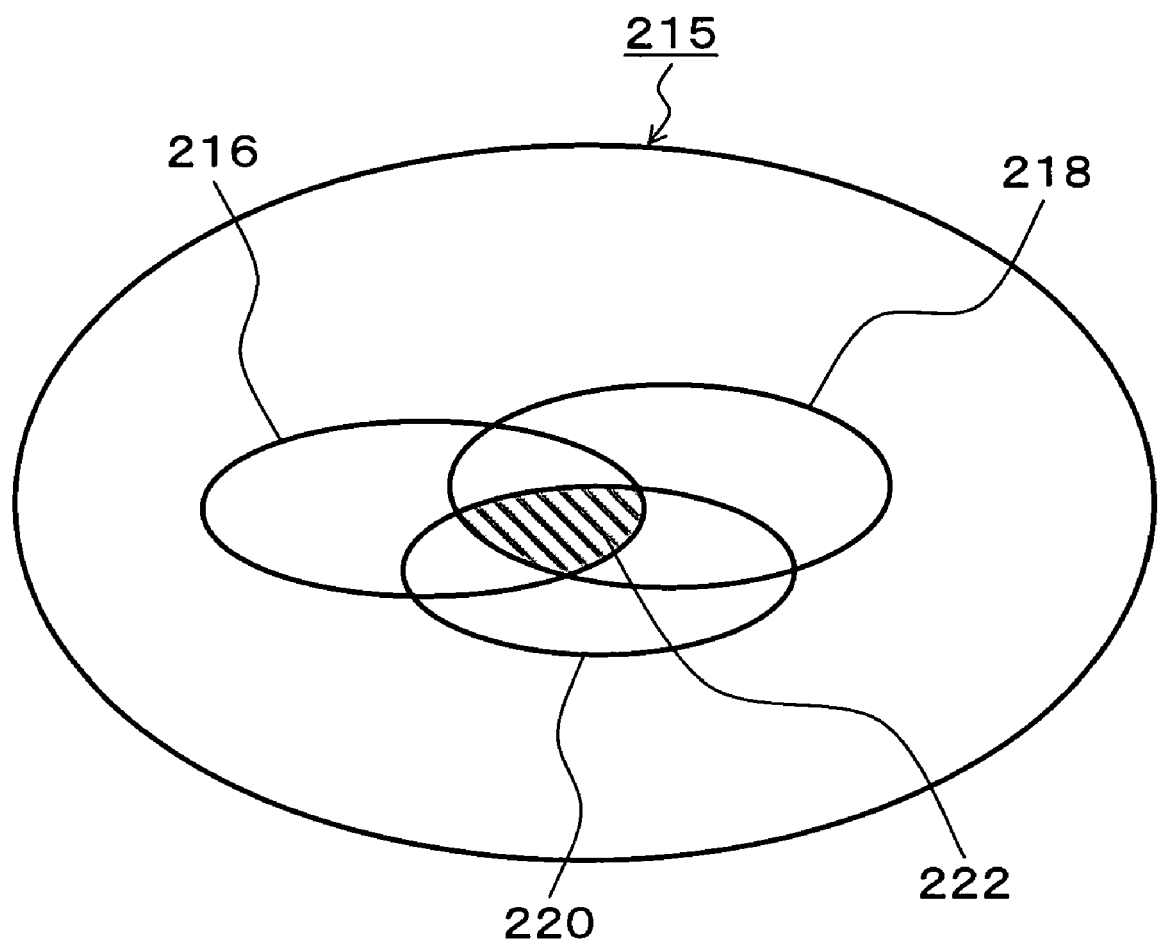
FIG. 16 is an explanatory diagram of a category estimated as an overlapping area of clusters of respective evaluation expressions in the category estimation process.

FIG. 16 is showing the relation between the clusters and the category in the category estimation process. In FIG. 16, with respect to an evaluation pair gathering 215 on the database, for example, three different evaluation expressions are used, and clusters 216, 218, and 220 each of which is a gathering of evaluation pairs of for each evaluation expression are extracted. The area in which the evaluation expressions of the three clusters 216, 218, and 220 are matched, that is, the evaluation pairs contained in an hatched part in which the clusters 216, 218, and 220 are mutually overlapped is used as a category 222 estimated by the three evaluation expressions.

Referring again to FIG. 15, after the plurality of evaluation expressions are combined in step S5; in step S6, whether, for example, the number of evaluation pairs contained in the category 222 of FIG. 16, that is, the number of elements is equal to or more than a predetermined number of minimum elements that is enough to build a gathering as a category is checked; and, if it is equal to or more than the number of minimum elements, in step S7, they are registered in the database as evaluation pairs that belong to the specified category. If the number of evaluation pairs is less than the minimum number of elements, estimation as a category is not performed since it cannot be built as a category. When gatherings of evaluation pairs are formed for various categories, for example, categories such as cars and food by such estimation of categories with respect to the evaluation pair database 20, a specific evaluation expression extraction process or a comparative analysis process, which will next be described, are enabled.

Figure 17:
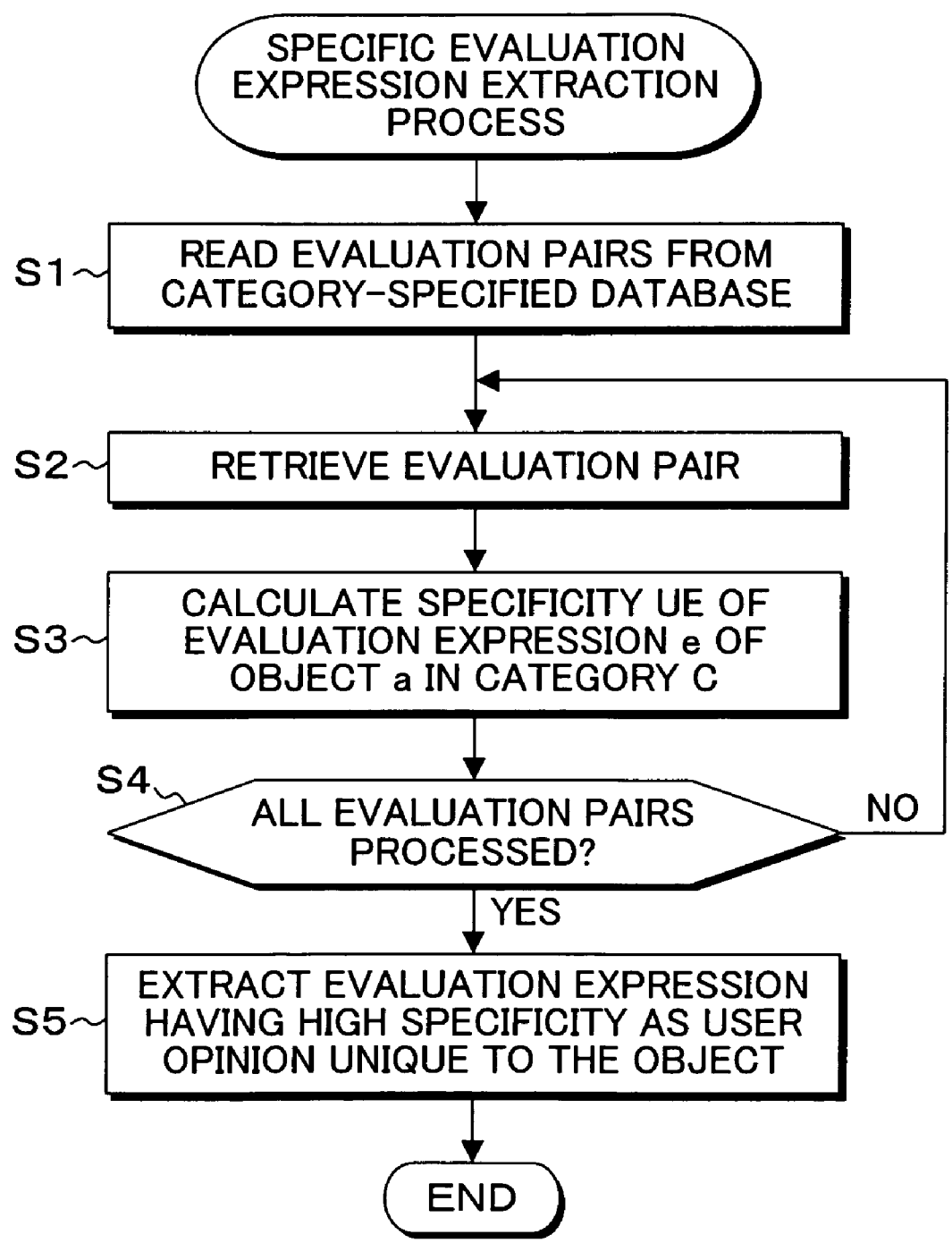
FIG. 17 is a flow chart of a specific evaluation expression extraction process according to the present embodiment.

FIG. 17 is a flow chart of the specific evaluation expression extraction process performed by the specific evaluation expression extraction unit 32 of FIG. 1. In evaluation pairs which belong to a particular category estimated with respect to the evaluation pair database 20, an evaluation expression that a particular object has can be used as evaluation characterizing the object. Therefore, by use of difference in distribution of evaluation expressions between objects of evaluation pairs, evaluation expression characterizing the objects, that is, specific evaluation expressions can be extracted. For example, when an evaluation expression "lovely" appears merely for a particular object in a gathering of evaluation pairs that belong to a category of a car, the evaluation expression "lovely" can be determined as a specific evaluation expression characterizing the object. In extraction of a specific evaluation expression with respect to the characteristic object, when an object a which belongs to a category C has an evaluation expression e, specificity UE (C, a, e) showing how the evaluation expression e is specific is obtained by the following expression.

$$UE(C, a, e) = \frac{fr(a, e)}{\sum_{i \in C, i \neq a} fr(i, e) + \varepsilon} \qquad (2)$$

Wherein, C is a category, a is an object, e is an evaluation expression, fr(a, e) is the number of evaluation pairs of the object a, fr(i, e) is the number of evaluation pairs other than the object a, and ε is a constant for preventing the denominator from becoming 0.

The numerator in the right side in the expression (2) is increased along with increase of the combinations of the object and the evaluation expression. Meanwhile, the denominator of the right side is increased along with increase of the combinations of other objects and the evaluation expression in the category. As a result, when an evaluation expression appears merely for a particular object, thereby increasing the numerator increases, and it does not often appear for other objects, thereby reducing the denominator, specificity UE (C, a, e) of the evaluation expression has a large value.

In the Specific Evaluation Expression extraction process of FIG. 16, a gathering of category-specified evaluation pairs is read from the database in step S1, an evaluation pair is retrieved in step S2, and specificity UE is calculated by the above described expression (2) in step S3. Subsequently, in step S4, whether all the evaluation pairs have been processed or not is checked; and, if the processing has not finished, the process returns to step S2 wherein the next evaluation pair is retrieved, and specificity UE is calculated in step S3. When processing of all the evaluation pairs is finished in step S4, an evaluation expression having high specificity calculated in step S5 is extracted as a user opinion unique to the object, that is, an opinion specific to the object.

FIG. 18 is an explanatory diagram of a specificity extraction list 224 obtained by the process of FIG. 17. The specificity extraction list 224 is composed of objects 226, evaluation expressions 228, and specificity 230; and, in this example, with respect to an evaluation expression "lovely" of an object A, the specificity 230 is calculated to have higher value than other objects, and the evaluation expression "lovely" can be extracted as unique object-characterizing evaluation for the object A.

Figure 19:
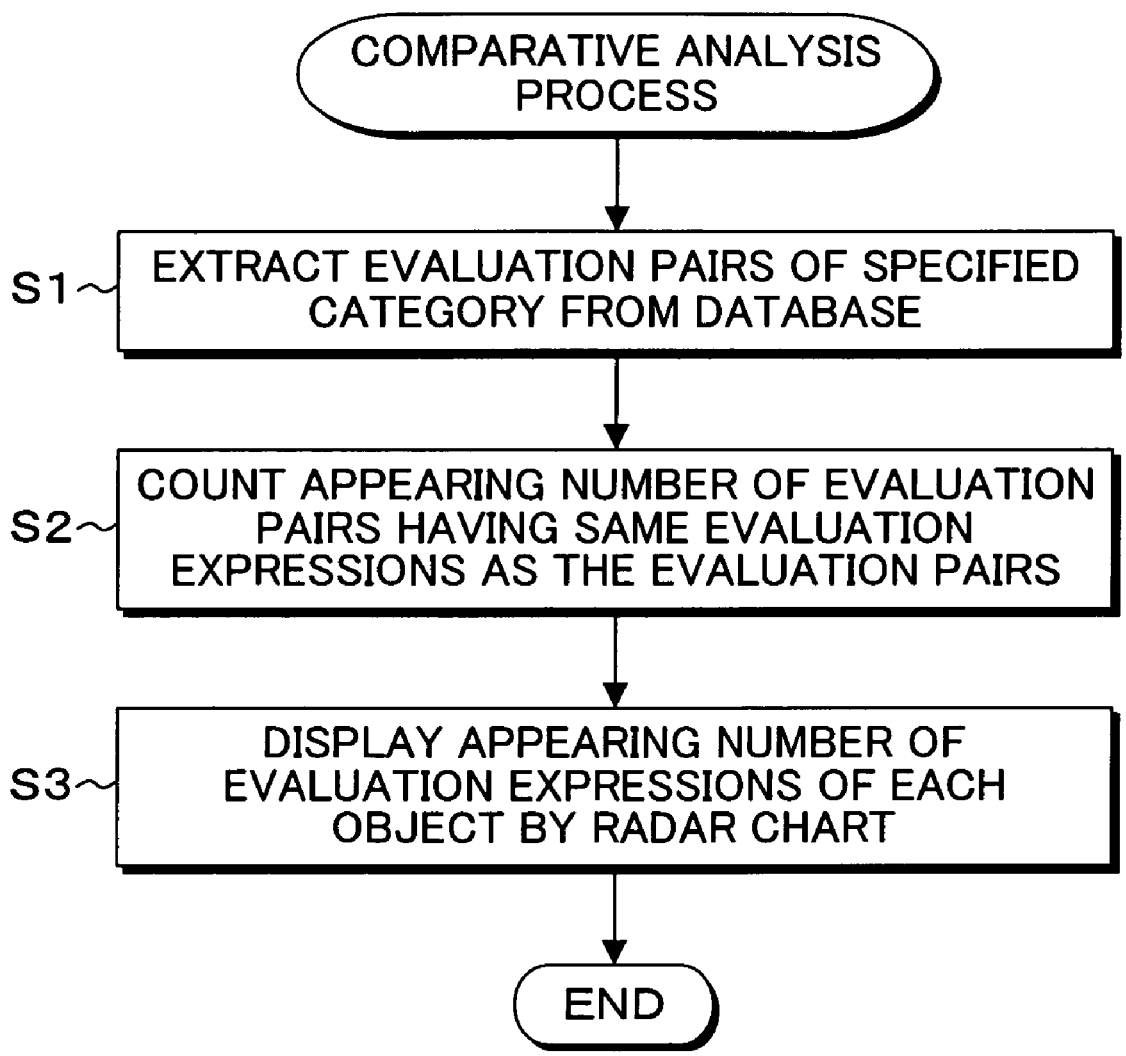
FIG. 19 is a flow chart of a comparative analysis process according to the present embodiment.
Figure 21:
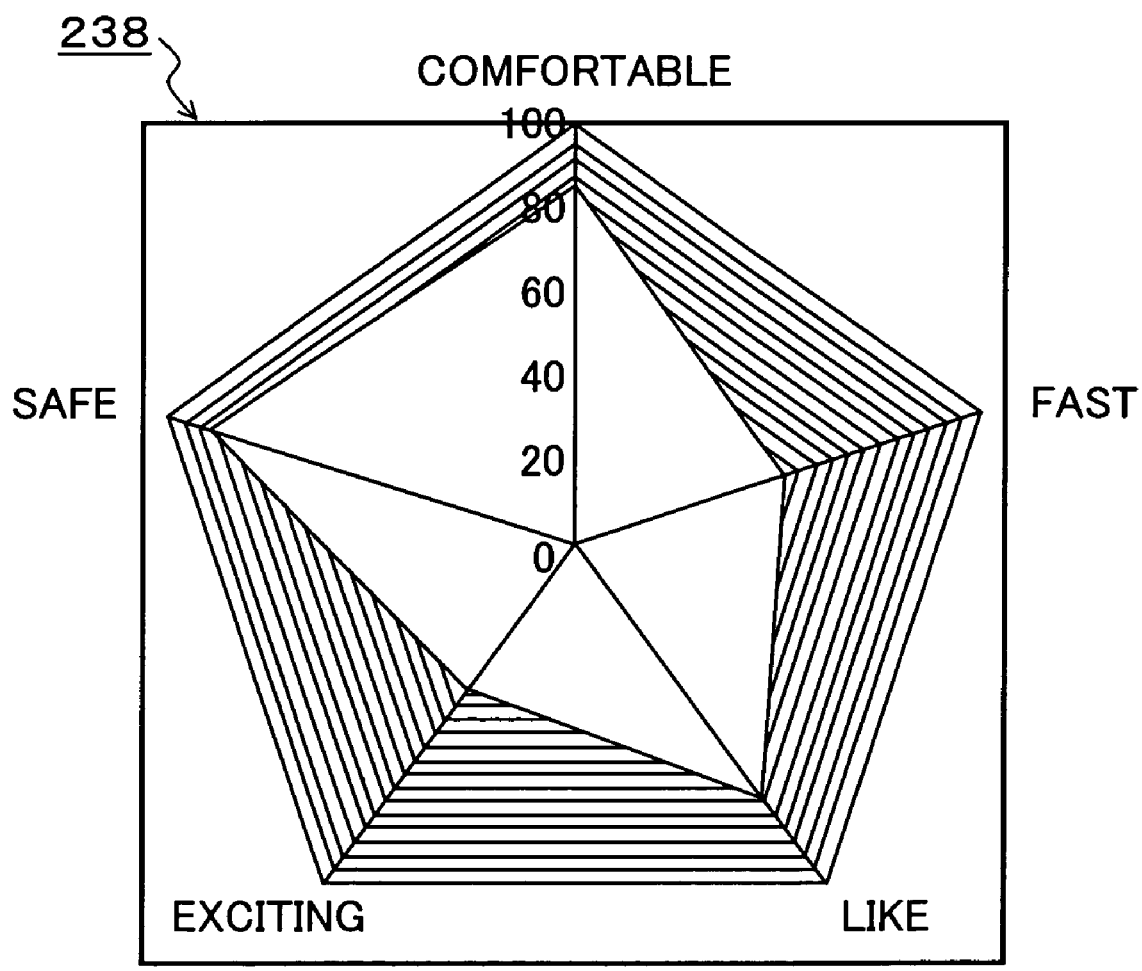
FIG. 21 is an explanatory diagram of a radar chart generated from the comparative analysis list of FIG. 20.

FIG. 19 is a flow chart of comparative analysis performed by the comparative analysis unit 34 of FIG. 1. Frequencies of appearance of evaluation expressions for each object number can be compared by counting the number of appearance of evaluation expression that evaluation pairs have in common in a gathering of the evaluation pairs sorted in a category of the evaluation pair database 20. When the number of appearance obtained for different evaluation expressions with respect to a particular object is used, a data chart can be drawn. For example, when evaluation expressions "fast", "like", and "interesting" appear for a plurality of objects in a gathering of evaluation pairs which belong to a category of a car, by counting the number of appearance of the evaluation expressions, the degree of the same evaluation expression, for example, "fast" can be compared between different objects. Inversely, when the number of appearance of each of evaluation expressions is counted for a car which is a particular object, the distribution that how users evaluate the object "car" can be understood. In the comparative analysis process of FIG. 19, in step S1, a gathering of evaluation pairs that belongs to a specified category is extracted from the database 20, and, with respect to the gathering of the evaluation pairs, for example, as shown in a comparative analysis list 232 of FIG. 20, the number of appearance of each of evaluation expressions "fast", "like", "interesting", "safe", and "comfortable" in the evaluation pairs is extracted respectively for comparison objects A, B, and C. When such comparative analysis list 232 is generated, in step S3, a radar chart 238 of FIG. 21 can be drawn, for example, by use of the number of appearance of the evaluation expressions of the object A. When such radar charts 238 are drawn also for the objects B and C in the same manner, reputation of users with respect to, if the reputation objects are cars, the cars A, B, and C can be evaluated.

Figure 22:
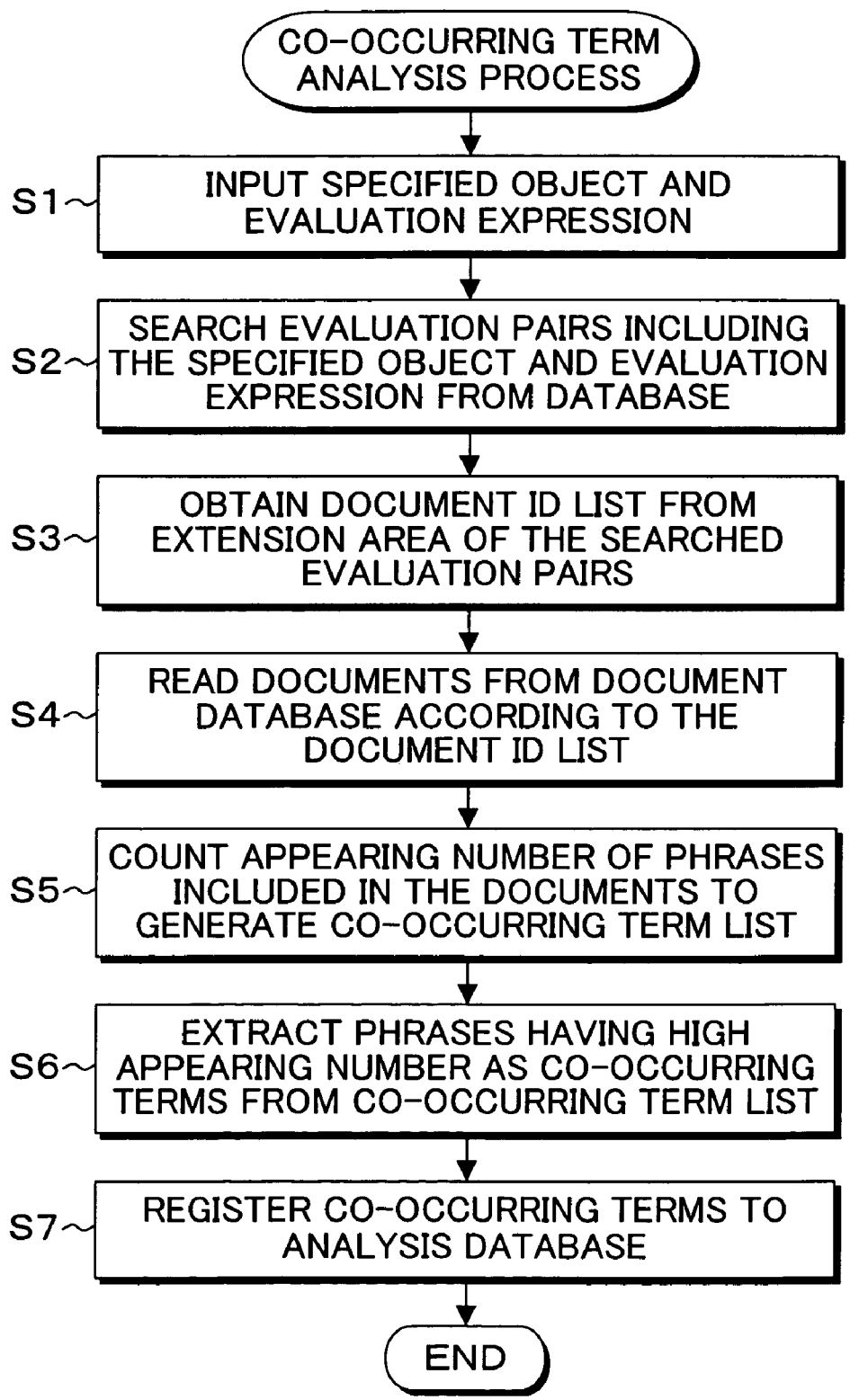
FIG. 22 is a flow chart of a co-occurring term analysis process of the present embodiment.

FIG. 22 is a flow chart of a co-occurring term analysis process in the co-occurring term analysis unit 36 of FIG. 1. In the present embodiment, the co-occurring term can be defined as a phrase which is contained in a document from which an evaluation pair is obtained and frequently appears other than the evaluation pair, and as a phrase which serves as a cause or a reason of the evaluation expression of the object. When such co-occurring term is extracted and displayed, information of background or basis of evaluation of an evaluation expression of an object in an evaluation pair can be analyzed. Furthermore, further detailed analysis of an evaluation pair can be performed by extracting and displaying a co-occurring term which is generated when an object is evaluated by a positive or a negative evaluation expression or a co-occurring term which is generated when it is evaluated by a particular evaluation expression. For example, in a case in which the number of appearance of an evaluation expression "hard to use" of an object "Company A" of an evaluation pair which belongs to the category of a car is high, for example, a phrase of "shift lever" frequently appears when words of documents using this evaluation pair are checked, it can be understood that the evaluation expression "hard to use" is used in relation to "shift lever".

In the co-occurring term analysis process of FIG. 22 performs the following process. First, a specified object and a evaluation expression are input in step S1, and evaluation pairs including the evaluation expression of the specified object are searched from the database in step S2. Then, in step S3, a list of the document IDs 178 of the searched evaluation pairs is obtained from the extension area 170 which is shown for the evaluation pair database 20 of FIGS. 9A and 9B, and the documents corresponding to the list of the document IDs are read from the document database. Subsequently, in step S5, the number of appearance of the phrases contained in the read documents is counted, and, for example, a co-occurring term list 240 such as that shown in FIG. 23 is generated. In the co-occurring term list 240, words 242 and appearance 244 are provided. Subsequently, in step S6, a phrase having a high appearance number is extracted as a co-occurring term from the co-occurring term list 240; and, in step S7, the co-occurring term is registered in an analysis database or the like.

Figure 24:
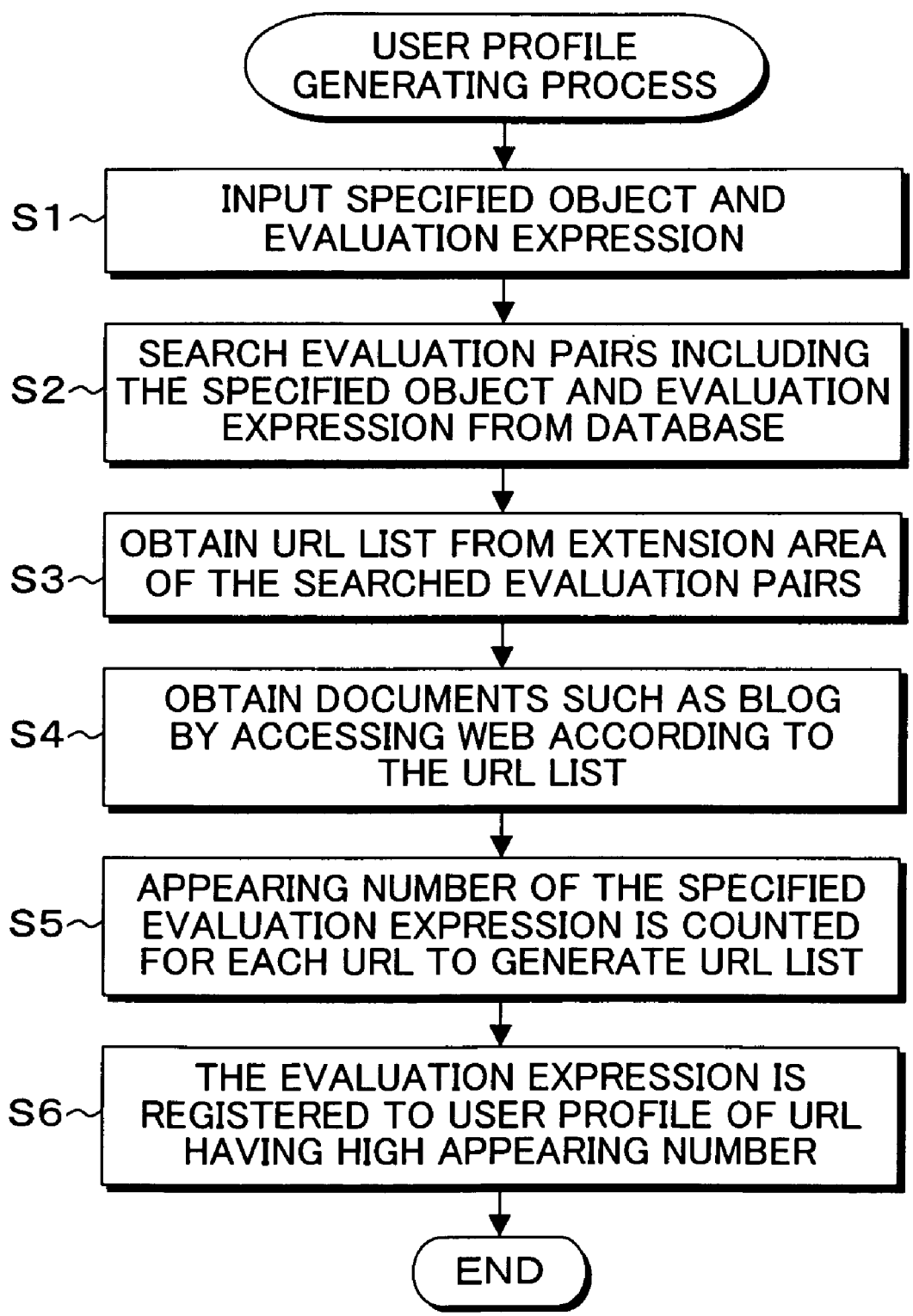
FIG. 24 is a flow chart of a user profile generating process according to the present embodiment.

FIG. 24 is a flow chart of a process performed by a user profile generating unit 38 of FIG. 1. As objective matters of text documents of users which serve as objects in the present embodiment, there are blogs. When text documents of blogs serve as objects of reputation processing, writers can be specified by the network addresses of the blogs. Therefore, the appearing number that "whether a particular evaluation expression is frequently used for a particular object" is checked for each writer specified by the network address of the blog by utilizing the evaluation pair database; and, when the appearing number is large, the evaluation expression is registered in a user profile of the writer of the blog.

In the user profile generating process of FIG. 24, a specified object and evaluation expression are input in step S1, and evaluation pairs including the specified evaluation expression and object are searched from the evaluation pair database in step S2. Subsequently, in step S3, with respect to the gathering of the searched evaluation pairs, a list of the URLs 182 is obtained from the extension area 170 shown in FIGS. 9A and 9B; and, in step S4, access is made to the webs according to the obtained URL list to obtain documents such as blogs. Subsequently, in step S5, the appearing number of the evaluation expression which is specified for each URL which is a network address showing the writer is counted, and a URL list 246 shown in FIG. 25 is generated. With respect to the URL list 246, in step S6, the evaluation expression specified in step S1 is registered in a user profile of the URL having a high appearing number. Note that the object and evaluation expression input in step S1 may be plural in accordance with needs.

Figure 26:
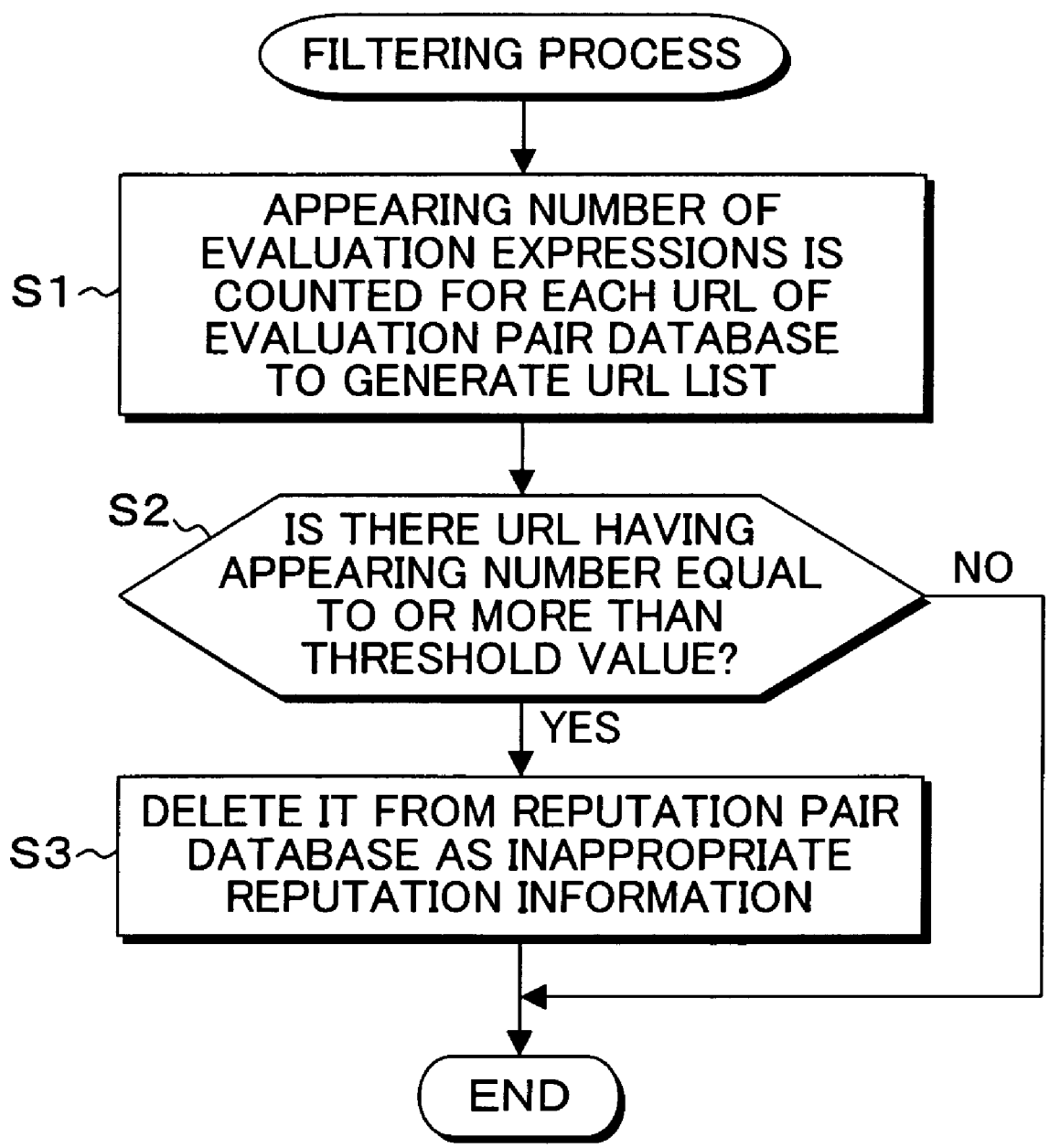
FIG. 26 is a flow chart of a filtering process according to the present embodiment.

FIG. 26 is a flow chart of a filtering process of FIG. 1. In the present embodiment, text documents are obtained from the webs for evaluation pair extraction; however, sometimes, evaluation pairs are automatically collected by obtaining text documents from sites in which articles are willfully written such as commerce sites or spam logs, and the text documents in which articles are willfully described are not appropriate as objects of evaluation documents. Generally, articles of commerce sites and spam logs are automatically generated; therefore, a number of same evaluation pairs are obtained from these documents. Therefore, in the filtering process of the present embodiment, when same evaluation pairs are extracted from a particular site more than a certain threshold value, a filtering process of determining that the evaluation pairs extracted from the site are inappropriate for reputation analysis and eliminating it is executed.

In the filtering process of FIG. 26, in step S1, the appearing number of an evaluation expression is counted for each URL of the extension area of the evaluation pair database 20, and, for example, a filtering list 252 is generated like FIG. 27. In the filtering list 252, the appearing number for evaluation expressions 256 such as "large", "lovely", and "beautiful" is counted. With respect to the thus-generated filtering list 252, whether there is a URL having the appearing number equal to or more than a threshold value is determined in step S2; and, if there is such URL, in step S3, the evaluation pairs corresponding to the determined URL are eliminated from the evaluation pair database 20 for that inappropriate expressions serve as reputation information. When extraction of inappropriate URL can be performed in this manner, thereafter, when text pages are to be extracted from blogs on the Internet with respect to inappropriate URLs can be avoided by generating a list of inappropriate URLs which serve as filtering objects.

Figure 28:
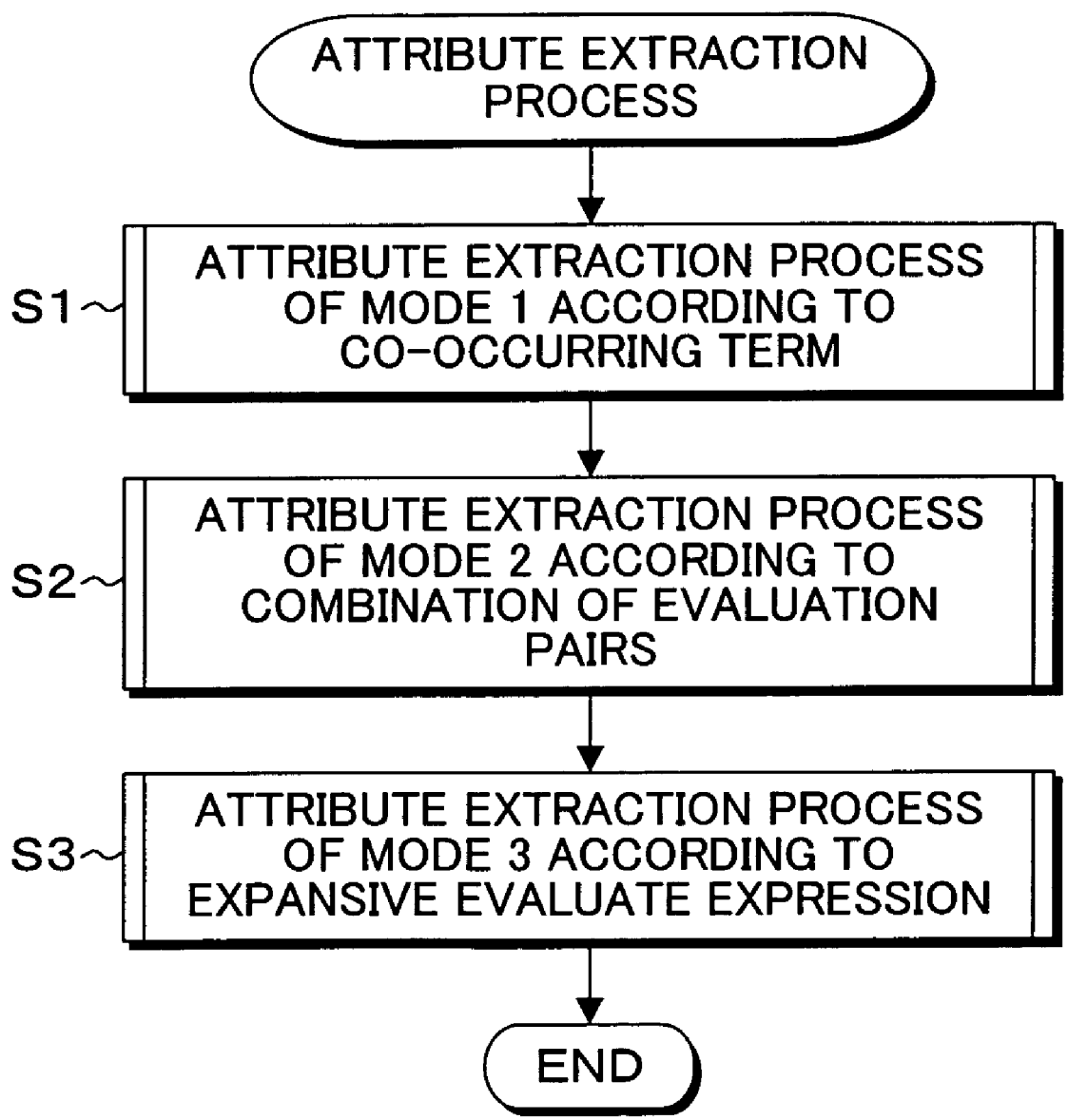
FIG. 28 is a flow chart of an attribute extraction process of the present embodiment.

FIG. 28 is a flow chart of an attribute extraction process performed by the attribute extraction unit 42 of FIG. 1. When attributes of evaluation pairs can be extracted with respect to a gathering of evaluation pairs which belong to a particular category with respect to the evaluation pair database 20, further detailed analysis based on extracted attributes can be performed. Herein, the attributes are, for example, "casting", "music", "story", etc. for an object "movie" of an evaluation pair; and, "CPU speed", "memory capacity", "HDD capacity", etc. for an object "personal computer". As such attribute extraction process, in the present embodiment, an attribute extraction process of mode 1 of step S1 according to a co-occurring term, an attribute extraction process of mode 2 of step S2 according to combinations of evaluation pairs, and an attribute extraction process of mode 3 of step S3 according to expansive evaluation expressions are performed. In the attribute extraction process of mode 1 of the co-occurring term of step S1, a co-occurring term supporting an evaluation expression of an object of a specified category per se is used as an attribute of the object. Therefore, in the extraction process of step S1 according to a co-occurring term and mode 1, the process of the flow chart of the co-occurring term analysis process shown in FIG. 22 is executed, and, for example, the co-occurring term list 240 shown in FIG. 23 is generated so as to extract phrases having the appearance number equal to or more than a predetermined value as attributes.

Figure 29:
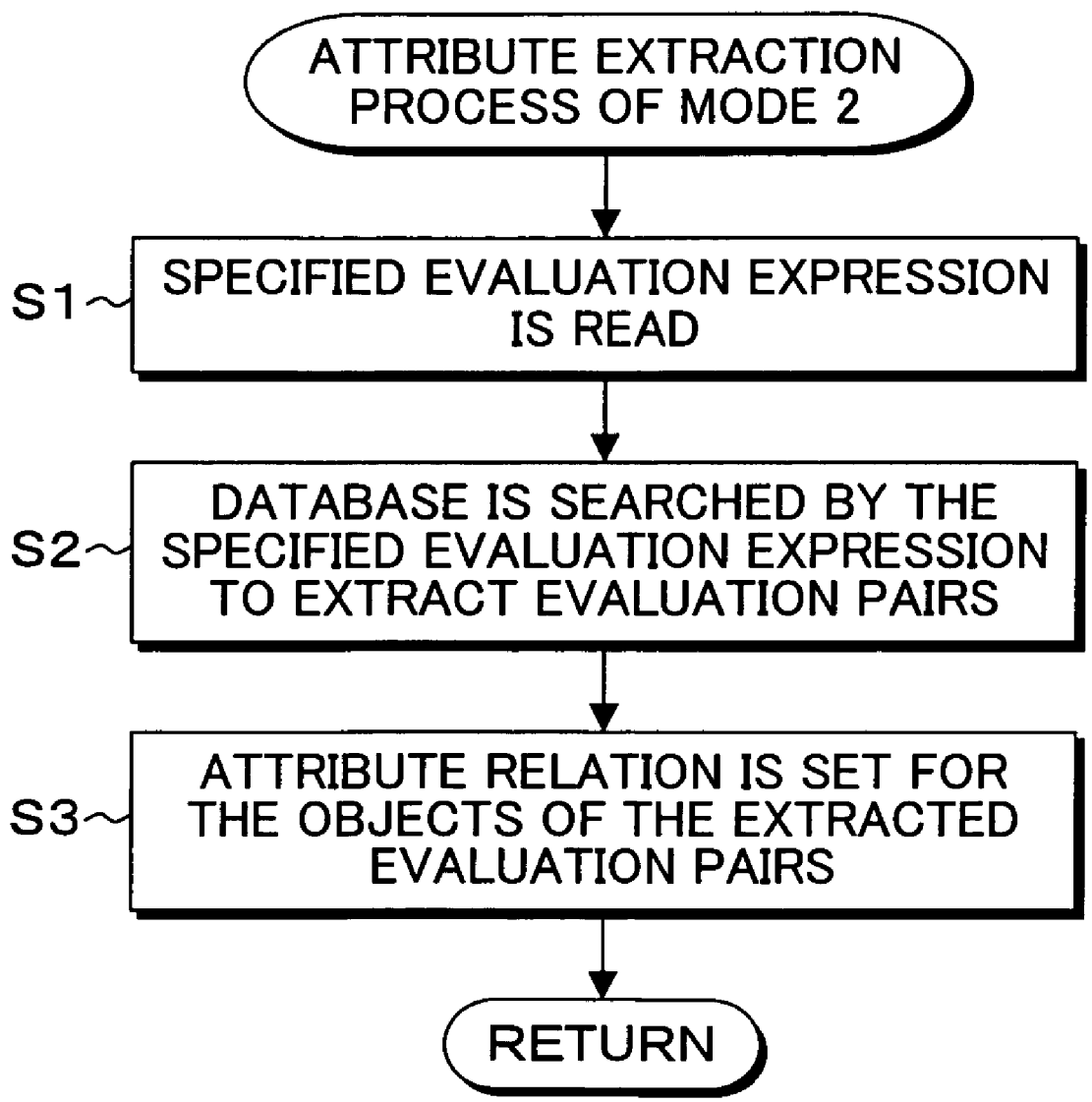
FIG. 29 is a flow chart of the attribute extraction process of mode 2 in FIG. 28.

FIG. 29 is a flow chart of the attribute extraction process of mode 2 of step S2 of FIG. 28 according to combinations of evaluation pairs. In the attribute extraction process according to combinations of evaluation pairs, when one evaluation expression is combined with a plurality of objects to form evaluation pairs, there are attribute relations between the plurality of objects having the same evaluate expression. For example, two evaluation expressions can be extracted from a sentence "sound of product A is good", like (object "product A", evaluation expression "good")

(object "sound", evaluation expression "good").

In such a case, when the values of the evaluation expression ID 180 in the extension area 170 in the evaluation pair database 20 of FIGS. 9A and 9B are the same, the evaluation expressions "good" of both of them can be determined to be the same; thus, the object "product A" and the object "sound" can be determined to be in an attribute relation. Thereat, in the attribute extraction process of mode 2, in step S1, a specified evaluation expression is read; in step S2, the database is searched according to the specified evaluation expression to extract evaluation pairs; and in step S3, an attribute relation is set for the object of the extracted evaluation pair.

Figure 30:
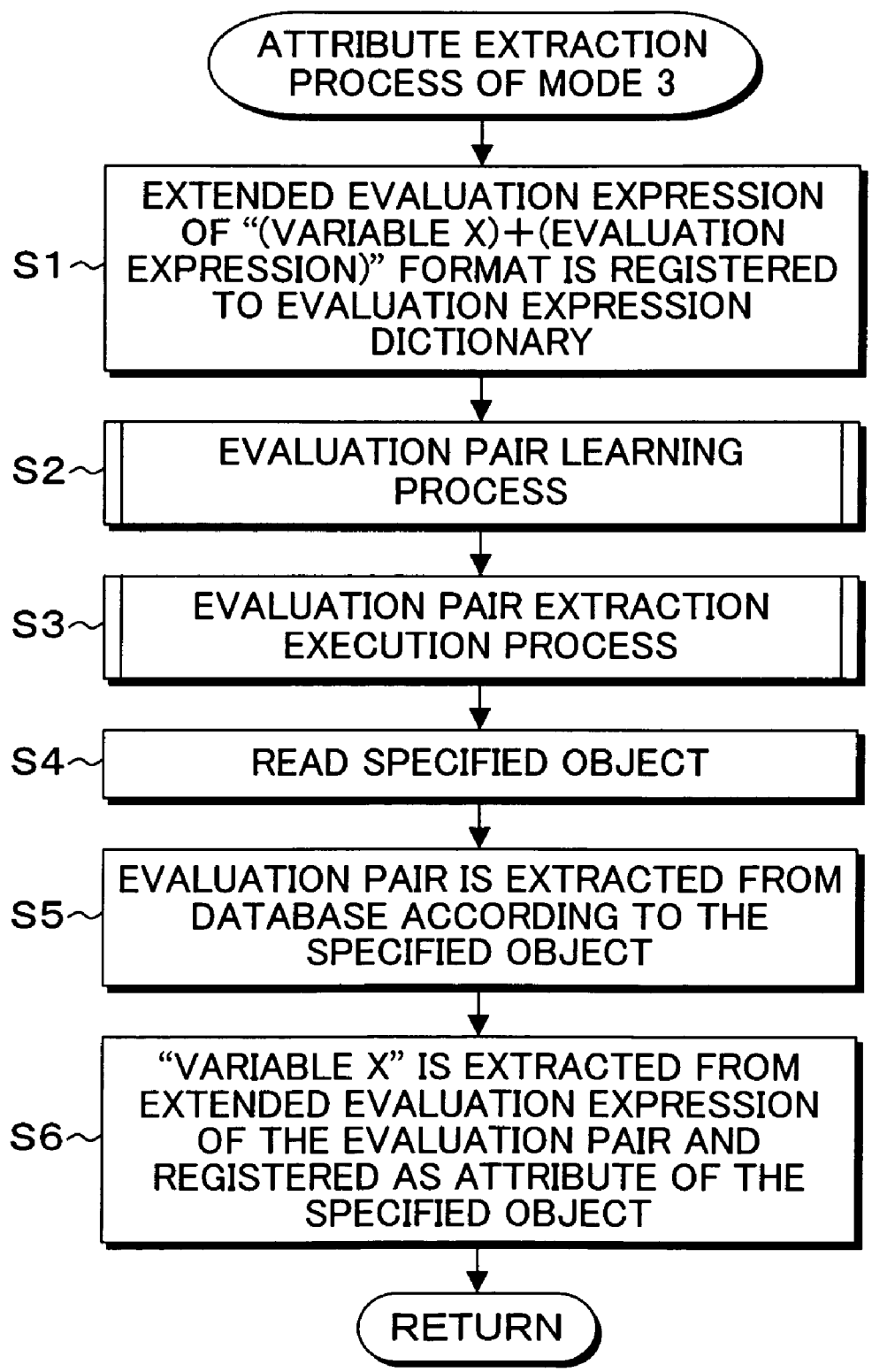
FIG. 30 is a flow chart of the attribute extraction process of mode 3 in FIG. 28.

FIG. 30 is a flow chart of the attribute extraction process of mode 3 in step S3 of FIG. 28. In the attribute extraction process of mode 3, a variable X of a pattern which is "variable X"+"evaluation expression", for example, "X is good"

is imparted to an evaluation expression as an expansive evaluation expression in the evaluation expression dictionary 76 used in the evaluation pair learning process of FIG. 4 and the evaluation expression dictionary 141 used in the evaluation pair extraction process of FIG. 8, so as to extract a phrase which fits in the variable X. For example, when merely evaluation expressions are used, evaluation pairs of (object "product A", evaluation expression "good")

(object "sound", evaluation expression "good")

are merely extracted from a document "sound of product A is good". However, when the expansive evaluation expression having the variable X like "X is good" is used as an expansive evaluation expression, extraction of an evaluation pair like {object "product A", expansive evaluation expression "X=sound"} can be realized. In the evaluation pair having such expansive evaluation expression, it is understood that the object "product A" has an attribute "sound" given by the variable X. Thereat, in the attribute extraction process of mode 3 of FIG. 30, in the first place, in step S1, an expansive evaluation expression having a format of "variable X"+"evaluation expression"

is registered in the evaluation expression dictionary. By use of the evaluation expression dictionary having such expansive evaluation expression, an evaluation pair learning process is executed in step S2. The evaluation pair learning process has the contents of the flow chart of FIG. 6. Then, in step S3, the sorting model obtained in the learning process of step S2 is used to execute an evaluation pair extraction process. This evaluation pair extraction process is same as the flow chart of FIG. 10. When an evaluation pair database is generated in this manner, in step S4, a specified object is read; in step S5, evaluation pairs are extracted from the evaluation pair database according to the specified object; and, in step S6, if there is an expansive evaluation expression in the evaluation pair, the "variable X" of the expansive evaluation expression is extracted and registered as an attribute of the specified object. The present embodiment employed, as examples, various analysis shown in the evaluation pair analysis unit 24 of FIG. 1; however, analysis using the evaluation pair database 20 is not limited to the present embodiment, and arbitrary reputation analysis processes can be performed in accordance with needs. The present invention corresponds to a program used in the reputation information processes, and the program has the contents of the flow charts shown in the present embodiment. In addition, the present invention provides a computer registration recording medium in which the reputation information processing program is recorded; and examples of the recording medium include: recording media such as a CD-ROM, a floppy (R) disk, a DVD disk, a magneto-optical disk, and an IC card; a recording apparatus such as a hard disk drive provided inside/outside a computer system; a database retaining the program via a line or another computer system and a database system; and a transmission medium on a line. In addition, the present invention includes arbitrary modifications that do not impair the object and advantages thereof, and the invention is not limited by the numerical values shown in the above described embodiment.

What is claimed is:

1. A computer-readable storage medium encoded with a reputation information processing program, the program when executed by a computer causes the computer to execute:

an evaluation pair extraction step of analyzing a document which is present on a network, extracting an evaluation pair in which an object and an evaluation expression are combined, and registering the evaluation pair in a database; and an evaluation pair analysis step of executing desired analysis by utilizing the evaluation pair of the database, wherein the evaluation pair extraction step further comprises:

evaluation pair learning step of giving an evaluation pair extracted from a model document for training to a machine learner so as to cause the machine learner to learn a rule which can serve as the evaluation pair; and an evaluation pair extraction execution step of inputting an unknown document to the machine learner and extracting an evaluation pair based on the learnt rule, the evaluation pair learning step includes:

a morpheme analysis step of subjecting the model document to morpheme analysis when a word is in a language in which words are continuous without being punctuated, and skipping the morpheme analysis of said model document when a word is in a language in which words are punctuated by spaces;

an object extraction step of extracting a unique expression and a noun phrase from the model document which has undergone morpheme analysis and causing the noun expression and the noun phrase to serve as objects;

an evaluation expression extraction step of extracting an evaluation expression from the model document which has undergone morpheme analysis by use of an evaluation expression dictionary;

a learning evaluation pair extraction step of extracting an evaluation pair candidate in which the object and the evaluation expression are combined, extracting a feature amount of the evaluation pair candidate, and setting whether the combination of the evaluation pair candidate is correct or not; and a model generating step of inputting a plurality of the feature amounts and the correctness of the learning evaluation pair to the machine learner, and generating weights of the individual feature amounts as an evaluation pair sorting model in which the rule which can serve as the learning evaluation pair is learnt and acquired, and the evaluation pair extraction execution step includes:

a morpheme analysis step of subjecting an unknown document to morpheme analysis in a case of a language in which words are continuous without being punctuated by spaces, and skipping a morpheme analysis of said model document in a case of a language in which words are punctuated by spaces;

an object extraction step of extracting a unique expression and a noun phrase from the unknown document which has undergone morpheme analysis and causing the noun expression and the noun phrase to serve as objects;

an evaluation expression extraction step of extracting an evaluation expression from the unknown document which has undergone morpheme analysis by use of an evaluation expression dictionary;

an evaluation pair candidate extraction step of extracting an evaluation pair candidate in which the object and the evaluation expression are combined; and an evaluation pair determination step of inputting the evaluation pair candidate to the machine learner, giving a plurality of feature amounts to the evaluation pair candidate by use of the evaluation pair sorting model, determining the evaluation pair candidate having a total sum of the individual feature amounts multiplied by the weights acquired in the evaluation pair learning step, equal to or more than a predetermined value as an evaluation pair of the unknown document, and registering the evaluation pair in the database.

2. The storage medium according to claim 1, wherein the object of the evaluation pair is a unique object including a product name, maker name, or the like which can be evaluated; and the evaluation expression of the evaluation pair is a phrase including like, hard to use, or the like which represents evaluation.

3. The storage medium according to claim 1, wherein the morpheme analysis step is executed merely for a document of a language such as Japanese, Chinese, or Korean in which words are not divided by spaces.

4. The storage medium according to claim 1, wherein in the evaluation pair extraction step, as extension information, a document ID, an evaluation expression ID, a network address including URL, a type of the object whether the object is a unique noun or a general noun are further added to the evaluation pair in which the object and the evaluation pair are combined.

5. The storage medium according to claim 1, wherein the evaluation pair analysis step has an input step of inputting one or a plurality of evaluation expression specifying a specified category;

an evaluation pair searching step of searching an evaluation pair for each of the input evaluation expression from the database; and a category estimation unit of estimating the searched evaluation pair as an evaluation pair which belongs to the specified category and registering the evaluation pair to the database.

6. The storage medium according to claim 5, wherein
in the category estimation unit, when the number of the searched evaluation pair is equal to or more than a predetermined minimum element number, the evaluation pair is estimated as an evaluation pair which belongs to the specified category.

7. The storage medium according to claim 5 or 6, wherein the evaluation pair analysis step has
a determination step of determining an evaluation expression specific to the object based on difference of distribution of evaluation expressions between a plurality of objects which belong to the category.

8. The storage medium according to claim 7, wherein in the determination step, $$UE(C, a, e) = \frac{fr(a, e)}{\sum_{i \in C, i \neq a} fr(i, e) + \varepsilon}$$

is calculated as specificity UE (C, a, e) for determining specificity of an evaluation expression,
wherein, C is a category
a is an object,
e is an evaluation expression,
fr (a, e) is the number of evaluation pair of the object a,
fr (i, e) is the number of evaluation pair other than the object a, and
$\varepsilon$ is a constant for preventing the denominator from becoming 0,
and the evaluation expression is determined to be a specific evaluation expression when the specificity is equal to or more than a predetermined threshold value.

9. The storage medium according to claim 5 or 6, wherein the evaluation pair analysis step has
an evaluation degree determination step of detecting, for each object, the appearing number of each evaluation expression that a plurality of objects which belong to the category has in common, and subjecting degrees of the evaluation expressions of a plurality of objects to comparative display.

10. The storage medium according to claim 9, wherein in the evaluation degree determination step,
a radar chart is drawn and displayed according to the appearing number of a plurality of the evaluation expressions detected for the object.

11. The storage medium according to claim 4, wherein the evaluation pair analysis step has
a document obtaining step of searching the document ID added to the evaluation pair composed of the specified object and the evaluation expression from the database and obtaining a document corresponding to the document ID; and
a co-occurring term analysis step of extracting a phrase other than the object contained in the obtained document, counting the appearing number of the phrase, and extracting the phrase having a large appearing number as a co-occurring term which serves as a cause or a reason of the evaluation expression of the object.

12. The storage medium according to claim 4, wherein the evaluation pair analysis step has
a network document obtaining step of searching a network address such as a blog added to the evaluation pair of the specified object and evaluation expression from the database and accessing the network address so as to obtain a document; and
a profile generating step of counting the appearing number of the evaluation expression contained in the obtained document and generating a user profile in which the appearing number of the evaluation expression is registered wherein the network address serves as a writer.

13. The storage medium according to claim 4, wherein the evaluation pair analysis step has
a filtering processing step of counting the appearing number of the evaluation expression for each network address from the evaluation pair database, and eliminating the evaluation pair of the network address having the appearing number which is equal to or more than a predetermined threshold value from the evaluation pair database.

14. The storage medium according to claim 5 or 6, wherein the evaluation pair analysis step has an attribute extraction step of extracting an attribute that the object which belongs to the category has.

15. The storage medium according to claim 14, wherein the attribute extraction step has
a document obtaining step of searching the document ID added to the evaluation pair composed of the specified object and evaluation expression from the database and obtaining a corresponding document; and
a co-occurring term analysis step of extracting a phrase other than the object contained in the obtained document so as to count the appearing number of the phrase, and extracting the phrase having a large appearing number as a co-occurring term which serves as a cause or a reason of the evaluation expression of the object; wherein, the co-occurring term extracted in the co-occurring term analysis step is set as an attribute of the object.

16. The storage medium according to claim 14, wherein the attribute extraction step has an evaluation pair combination analysis step of searching a combination of the evaluation pair including the specified evaluation expression from the database and setting an attribute relation between the object contained in the combination of the evaluation pair.

17. A reputation information processing method, comprising:
an evaluation pair extraction step of analyzing a document which is present on a network, extracting an evaluation pair in which an object and an evaluation expression are combined, and registering the evaluation pair in a database; and
an evaluation pair analysis step of executing desired analysis by utilizing the evaluation pair of the database, wherein
the evaluation pair extraction step further comprises:
an evaluation pair learning step of giving an evaluation pair extracted from a model document for training to a machine learner so as to cause the machine learner to learn a rule which can serve as the evaluation pair; and
an evaluation pair extraction execution step of inputting an unknown document to the machine learner and extracting an evaluation pair based on the learnt rules,
the evaluation pair learning step includes:
a morpheme analysis step of subjecting the model document to morpheme analysis when a word is in a language in which words are continuous without being punctuated, and skipping the morpheme analysis of said model document when a word is in a language in which words are punctuated by spaces;
an object extraction step of extracting a unique expression and a noun phrase from the model document which has undergone morpheme analysis and causing the noun expression and the noun phrase to serve as objects;

an evaluation expression extraction step of extracting an evaluation expression from the model document which has undergone morpheme analysis by use of an evaluation expression dictionary;

a learning evaluation pair extraction step of extracting an evaluation pair candidate in which the object and the evaluation expression are combined, extracting a feature amount of the evaluation pair candidate, and setting whether the combination of the evaluation pair candidate is correct or not; and a model generating step of inputting a plurality of the feature amounts and the correctness of the learning evaluation pair to the machine learner, and generating weights of the individual feature amounts as an evaluation pair sorting model in which the rule which can serve as the learning evaluation pair is learnt and acquired, and the evaluation pair extraction execution step includes:

a morpheme analysis step of subjecting an unknown document to morpheme analysis in a case of a language in which words are continuous without being punctuated by spaces, and skipping a morpheme analysis of said model document in a case of a language in which words are punctuated by spaces;

an object extraction step of extracting a unique expression and a noun phrase from the unknown document which has undergone morpheme analysis and causing the noun expression and the noun phrase to serve as objects;

an evaluation expression extraction step of extracting an evaluation expression from the unknown document which has undergone morpheme analysis by use of an evaluation expression dictionary;

an evaluation pair candidate extraction step of extracting an evaluation pair candidate in which the object and the evaluation expression are combined; and an evaluation pair determination step of inputting the evaluation pair candidate to the machine learner, giving a plurality of feature amounts to the evaluation pair candidate by use of the evaluation pair sorting model, determining the evaluation pair candidate having a total sum of the individual feature amounts multiplied by the weights acquired in the evaluation pair learning step, equal to or more than a predetermined value as an evaluation pair of the unknown document, and registering the evaluation pair in the database.

18. A reputation information processing apparatus embodied as a processor, the apparatus, comprising:

an evaluation pair extraction unit analyzing a document which is present on a network, extracting an evaluation pair composed of an object and an evaluation expression, and registering the evaluation pair in a database; and an evaluation pair analysis unit executing desired analysis by utilizing the evaluation pair of the database, wherein the evaluation pair extraction unit performs an evaluation pair learning step of giving an evaluation pair extracted from a model document for training to a machine learner so as to cause the machine learner to learn a rule which can serve as the evaluation pair and an evaluation pair extraction execution step of inputting an unknown document to the machine learner and extracts an evaluation pair based on the learnt rules, the evaluation pair learning step includes:

a morpheme analysis step of subjecting the model document to morpheme analysis when a word is in a language in which words are continuous without being punctuated, and skipping the morpheme analysis of said model document when a word is in a language in which words are punctuated by spaces;

an object extraction step of extracting a unique expression and a noun phrase from the model document which has undergone morpheme analysis and causing the noun expression and the noun phrase to serve as objects;

an evaluation expression extraction step of extracting an evaluation expression from the model document which has undergone morpheme analysis by use of an evaluation expression dictionary;

a learning evaluation pair extraction step of extracting an evaluation pair candidate in which the object and the evaluation expression are combined, extracting a feature amount of the evaluation pair candidate, and setting whether the combination of the evaluation pair candidate is correct or not; and a model generating step of inputting a plurality of the feature amounts and the correctness of the learning evaluation pair to the machine learner, and generating weights of the individual feature amounts as an evaluation pair sorting model in which the rule which can serve as the learning evaluation pair is learnt and acquired, and the evaluation pair extraction execution step includes:

a morpheme analysis step of subjecting an unknown document to morpheme analysis in a case of a language in which words are continuous without being punctuated by spaces, and skipping a morpheme analysis of said model document in a case of a language in which words are punctuated by spaces;

an object extraction step of extracting a unique expression and a noun phrase from the unknown document which has undergone morpheme analysis and causing the noun expression and the noun phrase to serve as objects;

an evaluation expression extraction step of extracting an evaluation expression from the unknown document which has undergone morpheme analysis by use of an evaluation expression dictionary;

an evaluation pair candidate extraction step of extracting an evaluation pair candidate in which the object and the evaluation expression are combined; and an evaluation pair determination step of inputting the evaluation pair candidate to the machine learner, giving a plurality of feature amounts to the evaluation pair candidate by use of the evaluation pair sorting model, determining the evaluation pair candidate having a total sum of the individual feature amounts multiplied by the weights acquired in the evaluation pair learning step, equal to or more than a predetermined value as an evaluation pair of the unknown document, and registering the evaluation pair in the database.

* * * * *

UNITED STATES PATENT AND TRADEMARK OFFICE
CERTIFICATE OF CORRECTION

PATENT NO.        : 7,599,926 B2
APPLICATION NO.   : 11/441147
DATED             : October 6, 2009
INVENTOR(S)       : Tetsuro Takahashi et al.

Page 1 of 1

It is certified that error appears in the above-identified patent and that said Letters Patent is hereby corrected as shown below:

Column 1, Line 5, after "2006" delete "/03/16".

Column 24, Line 56, change "rules," to --rule,--.

Column 26, Line 4, change "rules," to --rule,--.

Signed and Sealed this

Twenty-ninth Day of December, 2009

David J. Kappos
*Director of the United States Patent and Trademark Office*